United States Patent [19]
Haneda

[11] Patent Number: 5,890,178
[45] Date of Patent: Mar. 30, 1999

[54] DISPLAY OF DATA FILES INDICATED BY PASTING INSTRUCTING DATA INDICATING PASTING OF A DATA FILE IN A DISPLAYED DATA FILE

[75] Inventor: Isamu Haneda, Soraku-gun, Japan

[73] Assignee: Sharp Kabushiki Kaisha, Osaka, Japan

[21] Appl. No.: 943,334

[22] Filed: Oct. 3, 1997

Related U.S. Application Data

[62] Division of Ser. No. 425,443, Apr. 20, 1995, abandoned.

[30] Foreign Application Priority Data

Apr. 21, 1994 [JP] Japan .................................. 6-083517

[51] Int. Cl.$^6$ ...................................................... G06T 1/00
[52] U.S. Cl. ........................ 707/516; 345/113; 345/174; 345/180; 382/177; 382/189
[58] Field of Search .................................. 707/514–516, 707/526, 502, 520, 500, 522; 345/180, 173–179, 181–184, 113–114, 340, 343, 344, 339, 346, 348; 382/173, 177–179, 181–182, 185, 187–189, 202

[56] References Cited

U.S. PATENT DOCUMENTS

| | | | |
|---|---|---|---|
| 4,365,235 | 12/1982 | Greanias et al. | 382/189 |
| 4,680,804 | 7/1987 | Kazunuki | 382/187 |
| 4,723,211 | 2/1988 | Barker et al. | 707/514 |
| 4,763,356 | 8/1988 | Day, Jr. et al. | 379/368 |
| 4,872,000 | 10/1989 | Kano et al. | 345/180 |
| 4,933,880 | 6/1990 | Borgendale et al. | 707/515 |
| 4,974,260 | 11/1990 | Rudak | 382/311 |
| 5,001,765 | 3/1991 | Jeanty | 382/179 |
| 5,029,223 | 7/1991 | Fujisaki | 382/187 |
| 5,051,736 | 9/1991 | Bennett et al. | 345/180 |
| 5,051,930 | 9/1991 | Kuwabara et al. | 707/516 |
| 5,208,905 | 5/1993 | Takakura et al. | 707/515 |
| 5,276,794 | 1/1994 | Lamb, Jr. | 382/189 |
| 5,315,667 | 5/1994 | Fujisaki | 382/187 |
| 5,321,768 | 6/1994 | Fenrich et al. | 382/179 |
| 5,404,435 | 4/1995 | Rosenbaum | 707/515 |
| 5,414,228 | 5/1995 | Yamashita | 382/187 |
| 5,455,901 | 10/1995 | Friend | 395/149 |
| 5,533,147 | 7/1996 | Arai et al. | 382/179 |
| 5,550,930 | 8/1996 | Berman | 382/187 |
| 5,603,053 | 2/1997 | Gough et al. | 395/825 |
| 5,669,005 | 9/1997 | Curbow et al. | 707/523 |

FOREIGN PATENT DOCUMENTS 496886  3/1992  Japan .

OTHER PUBLICATIONS

Microsoft Windows User Guide, Microsoft Corporation, 1987, p. 163.

*Primary Examiner*—Joseph H. Feild

[57] ABSTRACT

An electronic apparatus has a display area of comparatively small surface area and is provided with a function selecting key unit for instructing execution of a plural number of data file preparing functions available on the electronic apparatus. A tablet is disposed on the display panel and the preset areas for display panel and tablet are provided as the display area. The tablet is provided with an input surface on which orthogonal coordinates are set in advance and outputs signals indicating the coordinate position instructed by a preset input pen. Image data including a group of coordinate points set on the input surface is prepared. When the input pen indicates pasting instruction, the data file specified by the pasting instruction is read out and displayed.

24 Claims, 27 Drawing Sheets

FIG. 17A
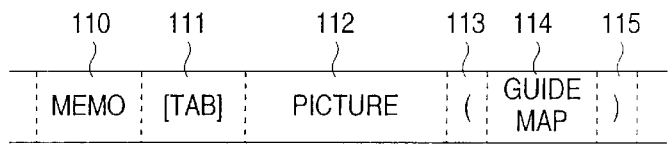
FIG. 17B
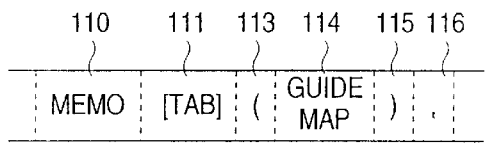
FIG. 18
| APPLICATION | DISPLAY OF MEMORY COLUMN AFTER PASTING | EXAMPLE OF REGISTRATION NAME IN ( ) |
|---|---|---|
| SCHEDULE | ∗ SCHEDULE (REGISTRATION NAME) | H4. 2.. 1, AM9.30 |
| TELEPHONE DIRECTORY | ∗ TEL (REGISTRATION NAME) | OX |
| REPORT | ∗ REPORT (REGISTRATION NAME) | |
| HANDWRITTEN MEMO | ∗ PICTURE (REGISTRATION NAME) | |

FIG. 21
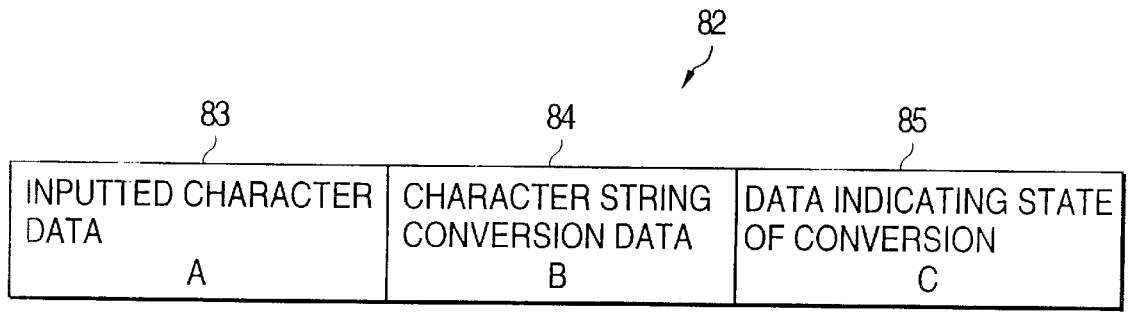
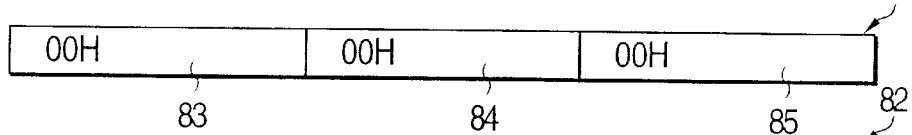
FIG. 22A
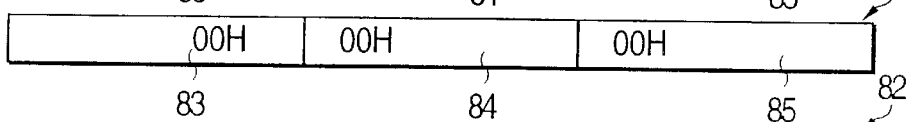
FIG. 22B
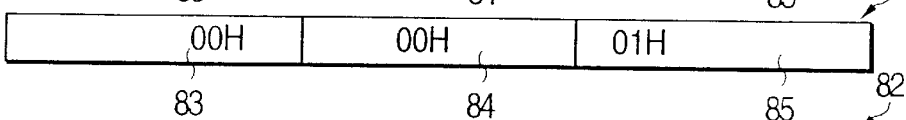
FIG. 22C
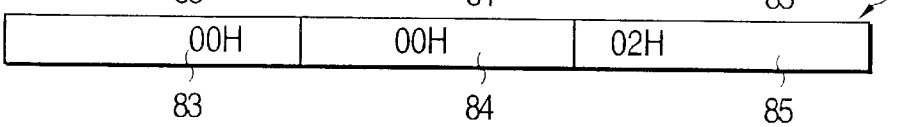
FIG. 22D

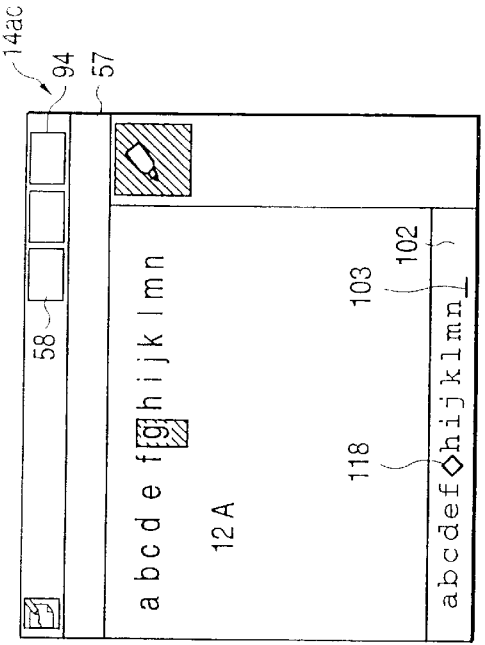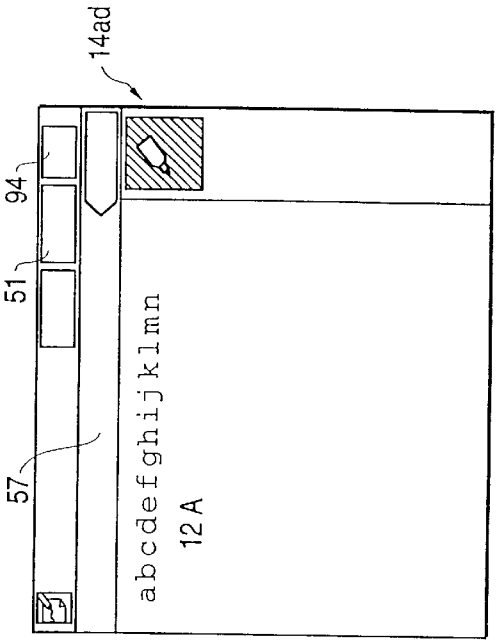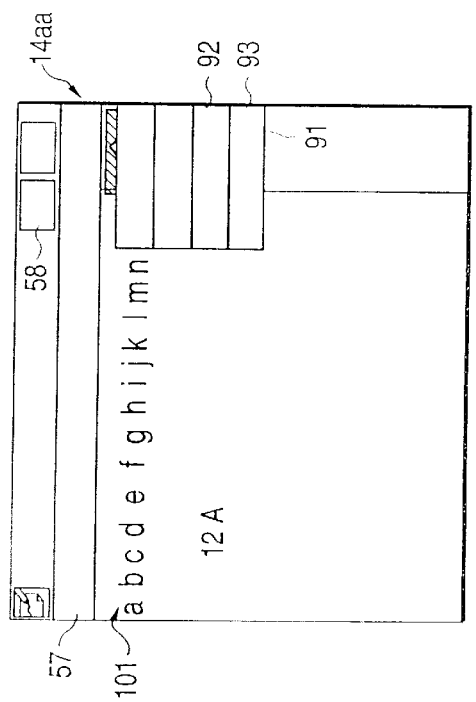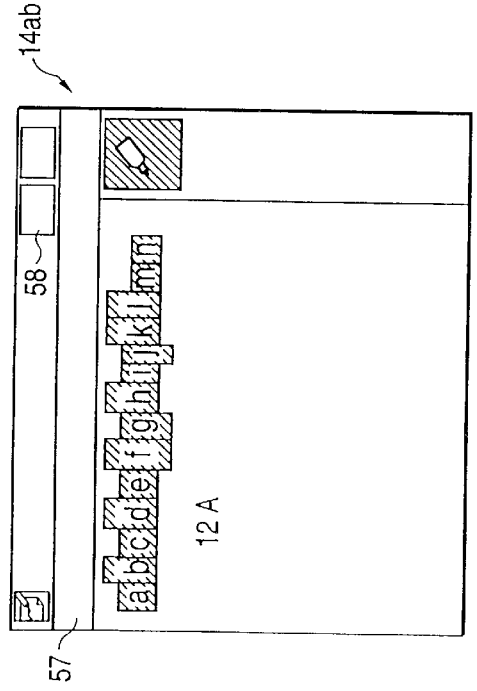

FIG. 27
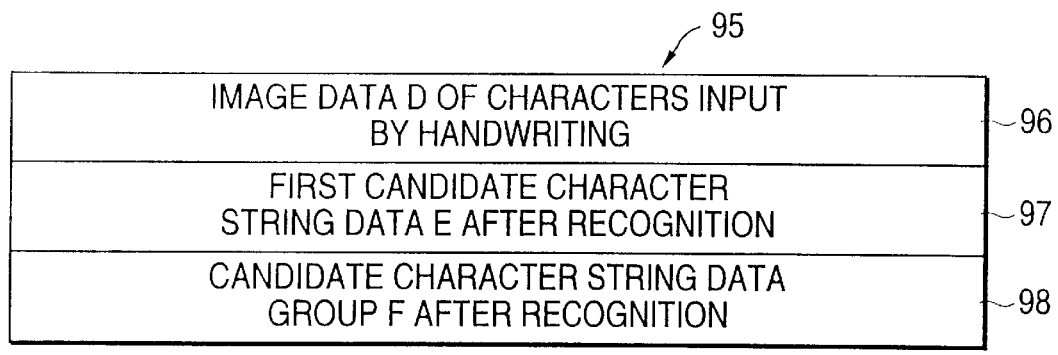
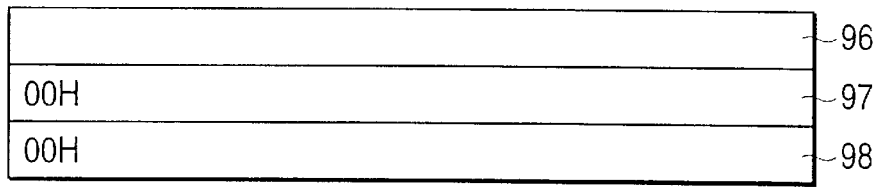
FIG. 28A
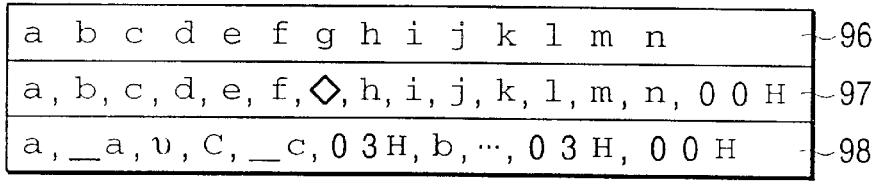
FIG. 28B
FIG. 29
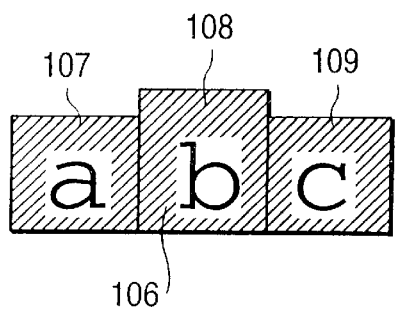

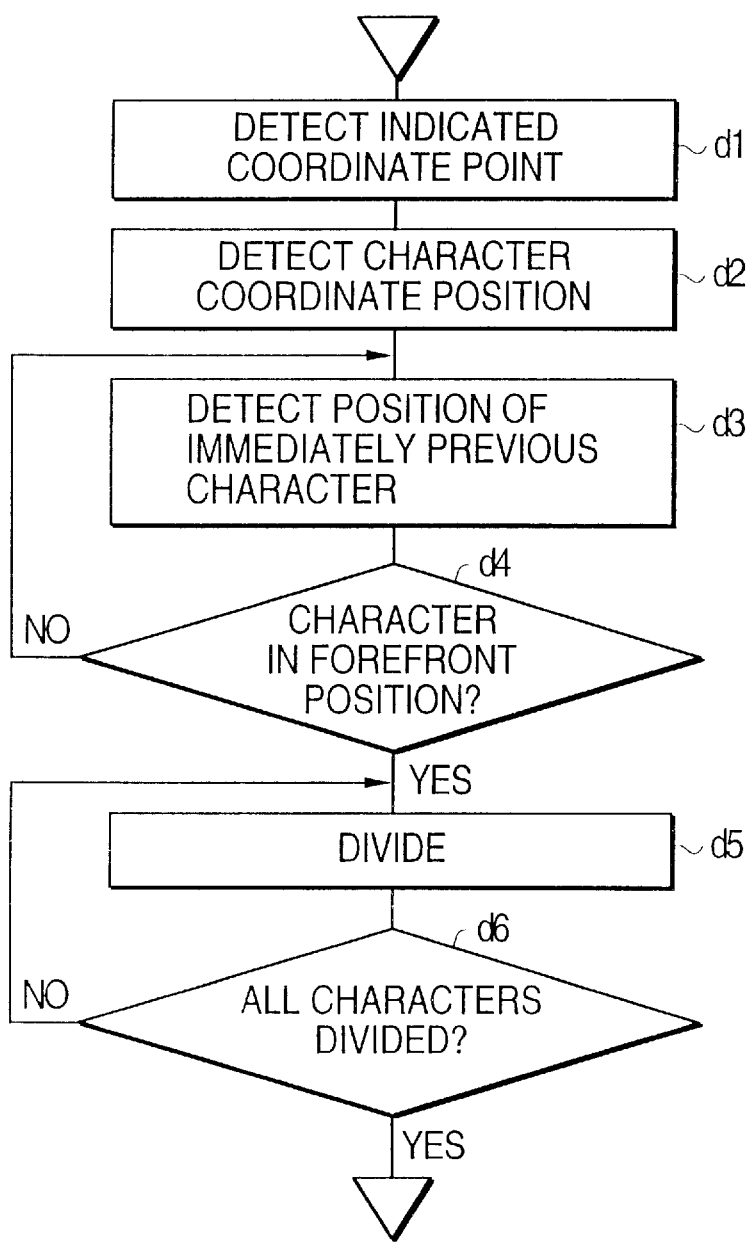

DISPLAY OF DATA FILES INDICATED BY PASTING INSTRUCTING DATA INDICATING PASTING OF A DATA FILE IN A DISPLAYED DATA FILE

This application is a divisional of application Ser. No. 08/425,443, filed on Apr. 20, 1995 abandoned.

BACKGROUND OF THE INVENTION

1. Field of the Invention

The present invention relates to a portable electronic apparatus having a function of preparing a plurality of data files and provided with means for inputting and displaying data.

2. Description of the Related Art

An electronic apparatus such as a personal computer, a word processor, etc. is provided with data file preparing means for preparing data files according to predetermined forms. For example, forms for preparing telephone directories, schedules, reports, handwritten memos, etc. are stored in the memory in advance and data files based on the respective forms are prepared. Moreover, with a view to improving conveniences of an electronic appapratus, the apparatus is provided with a so-called pasting function for inserting a data file prepared according to the form of a telephone directory in a data file prepared according to the form of a schedule, for example. The data file submitted to pasting is displayed, for example, on means for displaying provided on the electronic apparatus.

FIG. 35 is a plan view indicating an example of a display image 121 which appears when a data file submitted to pasting is displayed. It shows an example of a display image in the case where a data file named "Fax transmission" is prepared according to the form for preparing reports and a data file named "Guide map" prepared according to the form for preparing handwritten memos is pasted in that data file. The data file "FAX transmission" is composed of character data such as character codes, etc. while the data file "Guide map" is constituted by image data such as manually inputted map, etc. It is difficult to prepare such character data and image data with a single data file preparing means and, therefore, separate data files are prepared by using separate data file preparing means and then insertion of data is made with a pasting function as mentioned above.

On an electronic apparatus provided with a comparatively large screen such as a personal computer, a word processor, etc., a display image 121 in which the display image 123 of the data file "Guide map" is inserted in the display image 122 of the data file "FAX transmission" is displayed as shown in the drawing. The data file submitted to pasting is newly stored in the memory as a single data file.

Moreover, an electronic apparatus provided with a comparatively large screen such as a personal computer, a word processor and the like is provided with means for inputting data such as a keyboard, etc. and input is made from a plurality of keys provided on the keyboard. On the other hand, on a portable electronic apparatus such as a electronic pocket notebook, etc., inputting means such as a tablet, a touch panel, or the like are provided by accumulation on top of the displaying means instead of the keyboard to miniaturize the apparatus. A plurality of images (hereinafter referred to as "keys") corresponding to the kinds of processes performed by the apparatus are displayed on the displaying means, and the operator carries out inputting by touching the input surface of the inputting means corresponding to the keys with a given input pen. When the input surface of the inputting means corresponding to the displayed keys is touched by the input pen, the touched position is detected and the process corresponding to the displayed key including the touched position is executed.

Furthermore, some types of electronic apparatus using a tablet, a touch panel or the like, enable input of handwritten characters. Characters inputted in handwriting are once stored as image data, recognized as characters according to a prescribed procedure and then stored in memory as a code indicating recognized characters. An example of such electronic apparatus is disclosed, for example in Japanese Unexamined Patent Publication JPA 4-96886 (1992).

On an electronic apparatus provided with a comparatively small screen, it is difficult to make displays similar to those of a large electronic apparatus from the viewpoint of visibility, etc. and, for that reason, a display image displayed on a large electronic apparatus is split for showing. The same is true with the display of a data file submitted to pasting as mentioned above and the display image 121 as shown in FIG. 35 is displayed in a state of being split into several areas. For example, in the case where only the display image 122 of the data file "Guide map" is displayed here, a data file prepared by using another data file preparing means is displayed in spite of the fact that the data file preparing means for preparing reports is being executed. This spoils the consistency of display and produces an inconvenience that the operator just looks at the display image but cannot recognize the data file preparing means under execution, thus leading to a problem of poor operability of the electronic apparatus.

Moreover, on an electronic apparatus using tablet or touch panel, there are cases where the keys displayed on the displaying means are fixed and that the displayed keys are unnecessary depending on the content of execution of the electronic apparatus. If any unnecessary keys are displayed, the visibility drops because the display area available for the indication of data other than keys is reduced. In addition, it also causes a problem of reduced display area for each key, remarkably spoiling the operability of the electronic apparatus.

Furthermore, given as methods for recognizing characters are a method that characters are input one by one and the individual characters are recognized each time when they are input and a method that inputting all characters are input and then the characters in specified areas are recognized. With the former, in which individual characters are recognized each time when they are input, it is difficult to continuously input characters. Though continuous input of characters is possible if they are stored only as image data, complicated data processing becomes necessary for utilizing such image data with some other function. On the other hand, the latter enables continuous input of characters and Japanese Unexamined Patent Publication 4-96886 (1992) corresponds to the latter. The official gazette describes an example of recognition of characters made by specifying the area for each character after inputting all characters. In this example, there is an inconvenience that the area for recognition of characters must be specified for each character. It also produces another inconvenience that no recognition of characters can be made if the area specified for the input characters is improper.

SUMMARY OF THE INVENTION

An object of the present invention is to provide a compact electronic apparatus with excellent operability.

The present invention provides an electronic apparatus comprising:

inputting means provided with an input surface in which the orthogonal coordinates are set in advance, outputting a signal which indicates a coordinate point instructed by predetermined instructing means, and having the property of transmitting light, display means, a plurality of data file preparing means for preparing data files of prescribed forms based on the output of the inputting means, data file storing means for storing the data files, and data file reading means for reading the data files stored in the data file storing means and displaying on the display means, the inputting means being disposed on the display surface of the displaying means, the data file preparing means displaying a plurality of keys indicating the kinds of processes to be executed on the displaying means and recognizing the kind of key displayed in the position instructed by the inputting means to perform the process corresponding to the key, wherein the data file preparing means writes pasting instructing data indicating pasting of a data file prepared by other data file preparing means in the data file; and the data file reading means reads out the data file specified by the pasting instructing data from the data file storing means and displays the data file read out on the displaying means when the display position of the pasting instructing data is instructed by the inputting means while any data file including the pasting instructing data is displayed on the displaying means.

Moreover, the present invention provides an electronic apparatus comprising:

inputting means provided with an input surface in which the orthogonal coordinates are set in advance, outputting a signal which indicate a coordinate point instructed by predetermined instructing means and having the property of transmitting light, display means, a plurality of data file preparing means for preparing data files of prescribed forms based on the output of the inputting means, data file storing means for storing the data files, and data file reading means for reading the data files stored in the data file storing means and displaying on the display means, the inputting means being disposed on the display surface of the displaying means, the data file preparing means displaying a plurality of keys indicating the kinds of processes to be executed on the displaying means and recognizing the kind of key displayed in the position instructed by the inputting means to perform the process corresponding to the key, wherein the data file preparing means changes over the kind of keys to be displayed in correspondence to the process under execution by the data file preparing means.

Furthermore, the present invention provides an electronic apparatus comprising:

inputting means provided with an input surface in which the orthogonal coordinates are set in advance, outputting a signal which indicates a coordinate point instructed by predetermined instructing means, and having the property of transmitting light, display means, a plurality of data file preparing means for preparing data files of prescribed forms based on the output of the inputting means, data file storing means for storing the data files, and data file reading means for reading the data files stored in the data file storing means and displaying on the display means, the inputting means being disposed on the display surface of the displaying means, the data file preparing means displaying a plurality of keys indicating the kinds of processes to be executed on the displaying means and recognizing the kind of key displayed in the position instructed by the inputting means to perform the process corresponding to the key, wherein one of the plurality of data files preparing means is image data preparing means for preparing image data which is a group of coordinate points set on the input surface, based on the signals outputted by the inputting means; and the image data preparing means includes dividing means for splitting the image data into image data in single-character units according to a prescribed procedure and character recognizing means for recognizing character by selecting character candidate data similar to the divided image data in single-character units from among a prestored group of character candidate data.

According to the invention, electronic apparatus is provided with inputting means having the property of transmitting light, displaying means, a plurality of data file preparing means, data file storing means and data file reading means. The inputting means is provided with an input surface in which the orthogonal coordinates are set in advance, outputs a signal which indicates a coordinate point instructed by predetermined instructing means and is disposed on the display surface of the displaying means. The data file preparing means for preparing data files of prescribed forms based on the output of the inputting means displays a plurality of keys indicating the kinds of processes to be executed on the displaying means and recognizes the kind of the key displayed in the position instructed by the inputting means to perform the process corresponding to the key. The data file storing means stores the data files prepared by the data file preparing means while the data file reading means reads the data files stored in the data file storing means and displays them on the displaying means.

The data file preparing means writes pasting instructing data indicating pasting of data file prepared by other data file preparing means in the data file, and the data file reading means reads out the data file specified by the pasting instructing data from the data file storing means and displays the data file read out on the displaying means when the display position of the pasting instructing data is instructed by the inputting means while any data file including the pasting instructing data is displayed on the displaying means.

It is difficult to prepare, for example, a data file constituted by character data and a data file constituted by image data with one and the same data file preparing means. This is partly because processing of the data becomes complicated. Accordingly, one data file is prepared with a so-called pasting function for inserting a data file prepared by using certain data file preparing means into a data file prepared by a different data file i.e. inserting a data file constituted by image data in a data file constituted, for example, by character data.

In displaying data file prepared with the pasting function on an electronic apparatus provided with a comparatively large screen, data file constituted by character data and data file constituted by image data can be displayed in one and the same picture because the screen is large enough to display them.

On the other hand, on an electronic apparatus provided with a comparatively small screen, it is difficult to display in the same manner as that described above for reason of poor visibility, etc. For that reason, the data are split into several areas and displayed in several pictures. However, for example, in the case where the data are divided to be displayed, when only a data file constituted by image data is displayed, it causes an inconvenience that the operator cannot recognize the data file preparing means under execution because the displayed data does not correspond to the data file preparing means under execution.

According to the invention, pasting instructing data indicating pasting of data file prepared by other data file preparing means is displayed in the data file displayed on the displaying means. For that reason, on compact electronic apparatus realized by providing inputting means on top of the displaying means, etc., the amount to be displayed in one picture is enhanced and the operator can recognize the data file preparing means under execution by just looking at the display image. Since the data file specified by the pasting instructing data can be displayed on the displaying means by instructing the position of the pasting instructing data displayed on the displaying means by the inputting means, it is also possible to check the data file in which the pasting instructing data is inputted. In addition, since the data file in which the pasting instructing data is inputted is stored, the data storing area can be reduced in comparison with storing data file in which the data to be pasted is inputted.

Moreover, according to the present invention, the data file preparing means can change over the kind of the key to be displayed in correspondence to the process under execution by the data file preparing means. It is preferable that the data file preparing means has a first process and a plurality of second processes subordinated to the first process and can change over the kinds of keys in correspondence to the respective second processes.

Accordingly, no unnecessary key is displayed in the process under execution and therefore the kinds of keys displayed are reduced. This increases the surface area of the screen for displaying data other than keys and improves the visibility. It also increases the display area for each key and improves the operability. The second group of processes owned by the data preparing means are processes executed, for example, in the function as a word processor, and we may cite, for example, a process executed in the case of input of characters in "Hiragana" (a sort of Japanese character) and a process executed in the case of conversion of characters inputted in Hiragana into "Kanji" (a sort of Japanese character).

Furthermore, according to the present invention, one of the plurality of data file preparing means is an image data preparing means for preparing image data which is a group of coordinate points set on the input surface based on the signals outputted by the inputting means. The image data preparing means includes dividing means and character recognizing means, and the dividing means splits the image data into image data in single-character units according to a prescribed procedure, while the character recognizing means recognizes a character by selecting character candidate data similar to the divided image data in single- character units from among a prestored group of character candidate data.

Accordingly, it becomes possible for an operator to input handwritten characters in addition to the characters inputted from keys displayed on the displaying means. Characters inputted by handwriting are stored as image data and such image data is recognized as characters by being split into image data in single-character units, thus making it possible for the operator to continuously input a plurality of characters and to eliminate such troublesome operation of specifying the area of image data in single-character units.

Additionally, it is preferable to split the image data in single-character units which could not be recognized as characters, into two or more new image data in single-character units according to a procedure different from the prescribed procedure. Accordingly, the image data is further split to be recognized as a character and this contributes to improve the character recognition ratio of the image data.

Furthermore it is preferable that the image data preparing means can comprise altering means for changing the candidate character data to be modified into a candidate character data specified from among a prestored group of character candidate data when any change of recognized character is instructed, and this makes it possible to change the candidate character data into a desired candidate character data when the recognized character is improper.

As described above, according to the invention, pasting instructing data indicating pasting of data file prepared by other data file preparing means is displayed in the data file displayed on the displaying means. Therefore, on electronic apparatus provided with a comparatively small screen, the data file under execution by the data file preparing means is displayed on the displaying means and the operator can recognize the data file preparing means under execution by only looking at the display image. It is also possible to identifying the data file specified by the pasting instructing data by only instructing the position of the pasting instructing data indicating pasting by the inputting means. In addition, since the data file in which the pasting instructing data is inputted is stored, it becomes possible to reduce the data storing area in comparison with the case of storing a data file in which the data to be pasted is inputted.

Moreover, according to the present invention, the key to be displayed on the displaying means is changed over in correspondence to the process under execution by the data file preparing means, preferably in correspondence to each of the plurality of processes of the second group which is owned by the data file preparing means and depends on the first process. Accordingly, displaying of unnecessary keys is eliminated and therefore the kinds of keys displayed are reduced. This increases the surface area of the screen for displaying data other than keys and improves the visibility. Additionally the display area for each key is increased and the operability is improved.

Moreover, according to the present invention, image data is prepared on the basis of the output of the inputting means and this image data is recognized as characters by being split into image data in single-character units. Accordingly, it becomes possible for the operator to input characters in handwriting and continuously input a plurality of characters. Additionally, it becomes possible to eliminate such a troublesome operation that the area for the image data in single-character units should be specified. Moreover, since it is possible to split image data in single-character units which could not be recognized as character into at least two new image data in single- character units, the character recognition ratio of the image data improves. In addition, because any recognized candidate character data can be changed to specified candidate character data, is possible to change the recognized character to desired character when it is improper.

BRIEF DESCRIPTION OF THE DRAWINGS

Other and further objects, features, and advantages of the invention will be more explicit from the following detailed description taken with reference to the drawings wherein:

FIGS. 17A, 17B are drawings showing a part of the data newly stored as "Fax transmission" after the end of the pasting operation;

FIG. 18 is a drawing showing applications and characters displayed on a screen at the time of pasting the data prepared in the respective applications;

FIGS. 20A–20D are plan views showing in progressive steps a display image displayed at the time of inputting characters made by using the typewriter input board 38;

FIG. 21 is a drawing showing the constitution of a buffer 82 for character conversion;

FIGS. 22A–22D are drawings showing the buffer 82 for character conversion at the time of inputting of characters "shoudan" (=business talk);

FIGS. 26A–26D are plan views showing in progressive steps the display image displayed at the time of recognition of characters inputted in handwriting;

FIG. 27 is a drawing showing the constitution of a buffer 95 for recognition of characters;

FIGS. 28A, 28B are drawings showing the buffer 95 for recognition of characters at the time of recognition of characters;

FIG. 29 is a drawing for explaining the procedure of splitting image data D into the data in single-character units;

FIG. 33 is a flow chart showing the operation at the time of splitting of the image data D;

DETAILED DESCRIPTION OF THE PREFERRED EMBODIMENT

Figure 1:
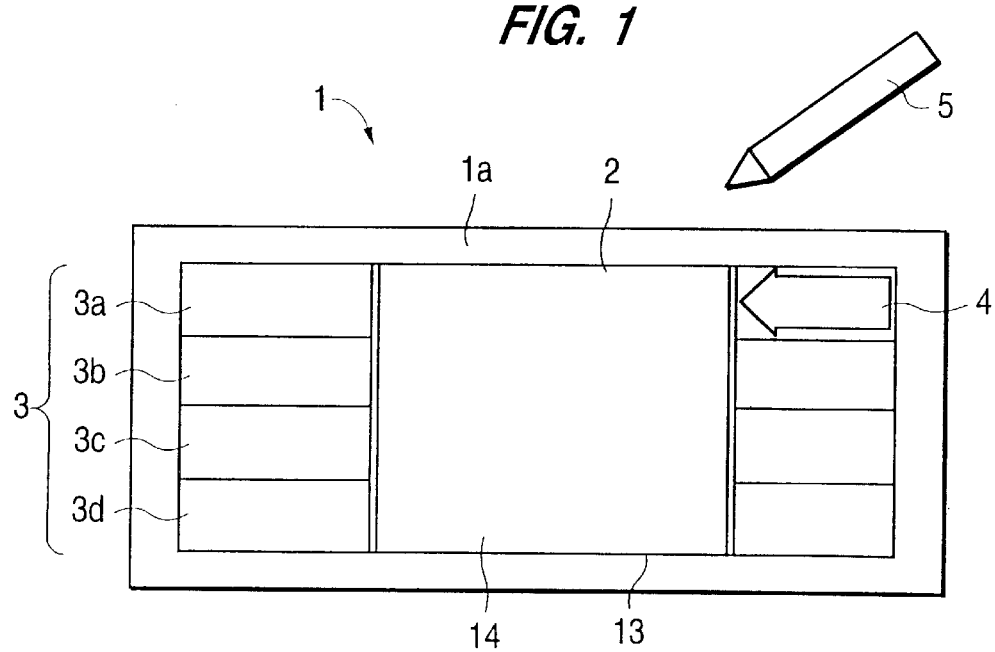
FIG. 1 is a front view showing the appearance of an electronic apparatus 1 of an embodiment of the invention.

Now referring to the drawings, preferred embodiments of the invention are described below.

FIG. 1 is a front view showing the appearance of an electronic apparatus 1 which is an embodiment of the present invention. The electronic apparatus 1 is provided with a display panel 2 which is display means disposed, for example, at the center of a case 1a of 150 mm×90 mm and with the function selection key unit 3 and the menu key unit 4, etc. disposed on both sides of the case 1a. The display panel 2 is realized, for example, with a liquid crystal element and is provided with a predetermined display area 14 of, for example, 240 dots×170 dots. Moreover, on the display panel 2, the tablet 13 which is inputting means to be described below is stacked and various kinds of input are performed by indicating the icon, the key and the button to be displayed on a display area 14 of the display panel 2 with an input pen 5. Also inputting from the function selection key unit 3 and the menu key unit 4 can be made with the input pen 5 with the use of the tablet 13.

The electronic apparatus 1 of this embodiment is provided with a schedule function, a telephone directory function, a report function and a handwritten memo function as data file preparing functions and composed of a schedule key 3a, a telephone directory key 3b, a report key 3c and a handwritten memo key 3d respectively corresponding respectively to the above-mentioned functions. In this embodiment, explanation is given of an example in which the function selection keys unit 3 is constituted by 4 kinds of key but the keys are not limited to 4 pieces but the number of keys is selected depending on the kinds of function to be provided on the electronic apparatus 1.

Figure 2:
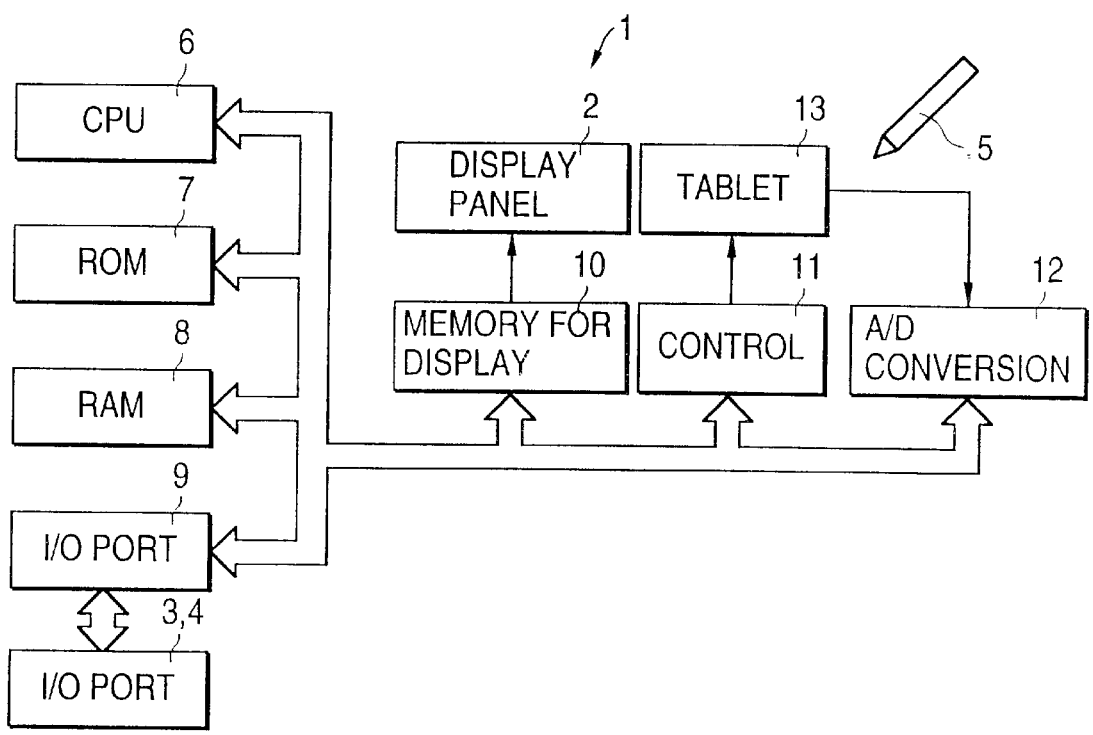
FIG. 2 is a block diagram showing the electrical constitution of the electronic apparatus 1.

FIG. 2 is a block diagram showing the electrical constitution of the electronic apparatus 1. The electronic apparatus 1 comprises the display panel 2, a keyboard including the function selection key unit 3 and the menu key unit 4, and the input pen 5, as well as a central processing unit (hereinafter referred to as "CPU") 6, a read only memory (hereinafter referred to as "ROM") 7, a random access memory (hereinafter referred to as "RAM") 8, an I/O (input/output) port 9, a memory 10 for display, a control circuit 11, an A/D (analog/digital) converter 12 and the tablet 13.

The CPU 6 controls the operation of the electronic apparatus 1 according to the program written in the ROM 7. In the ROM 7, operation programs corresponding to the icon, key and buttons, etc. is stored in advance. The RAM 8, which is a memory available for both reading and writing, is used as a work area for internal processing of CPU 6 and a memory for storing data, etc. The I/O port 9 is placed between the keyboard including the function selection key unit 3 and the menu key unit 4 and the CPU 6 to transmit the pressing situation of the keys, etc. to the CPU 6.

In the display memory 10, the data to be displayed on the display panel 2 is written. The control circuit 11 controls the voltage to be applied to the tablet 13 stacked on the display panel 2. The tablet 13, for which is selected a resistance film type, for example, having the property of transmitting light, is submitted to application of the prescribed voltage respectively in the X-axis direction and the Y-axis direction of the orthogonal coordinates set in advance on the input surface and outputs the analog coordinate signals indicating the coordinate points specified with the input pen 5 which is prescribed instructing means. The A/D converter 12 converts the analog coordinate signals into digital signals fit for processing by the CPU 6.

Unless otherwise specified, the input operation by an operator in this embodiment is performed by indicating the input surface of the tablet 13 with the input pen 5. The resistance film type tablet 13 having the property of transmitting light is constructed by forming resistance films realized with an ITO (indium tin oxide) or the like on a pair of flexible light transmitting substrates and disposing the resistance films so as to oppose to each other at a certain distance therebetween. A prescribed voltage is applied to one of the resistance films. The applied voltage varies continuously from the input terminal side to the output terminal side. The other of the resistance films, which is not grounded, is used for detection of voltage.

When the tablet 13 is touched with the input pen 5, the resistance films at the touched position get in contact with each other and voltage is detected from the side of the other resistance film. Putting the direction from the input terminal to the output terminal of the one resistance film, for example, as the X-axis direction on the orthogonal coordinates, this voltage is of a value expressing the coordinate point in the X-axis direction. In the same way, the prescribed voltage is applied to the other resistance film in the Y-axis direction orthogonal to the X-axis direction on the orthogonal coordinates and the voltage is detected from the side of the one resistance film, the coordinate point in the Y-axis direction pointed by inputting with the pen can be obtained.

By switching the above mentioned operations at a predetermined timing to be conducted, the coordinate points by inputting with the pen is detected at any time. The CPU 6 executes the processes corresponding to the icon, keys and buttons displayed including the detected coordinate points. In this embodiment, explanation is given of an example of the tablet 13 of a resistance film type but the tablet 13 is not limited to the resistance film type and it can also be of either an electromagnetic induction type or a static induction type.

Figure 3A:
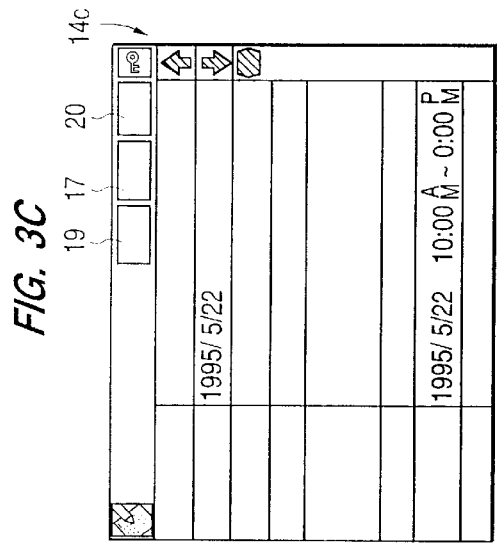
FIGS. 3A–3D are plan views showing in progressive steps a display image displayed at the time of preparation of meeting minutes.

Next, explanation will be given of the basic operating method of the electronic apparatus 1. FIGS. 3A–3D are plan views showing in progressive steps the display image displayed at the time of preparation of meeting minutes. The electronic apparatus 1 is provided with schedule function for recording schedule, telephone directory function for recording telephone numbers, report function for preparing reports and handwritten memo function for drawing illustrations or diagrams, etc. and the desired function is selected from among the function selecting key unit 3. To prepare a meeting minutes, the report key 3c is selected to display the display image 14a as shown in FIG. 3A. This display image 14a is an image indicating the registered file list and the illustrated image shows that no registered file exists.

Figure 3C:
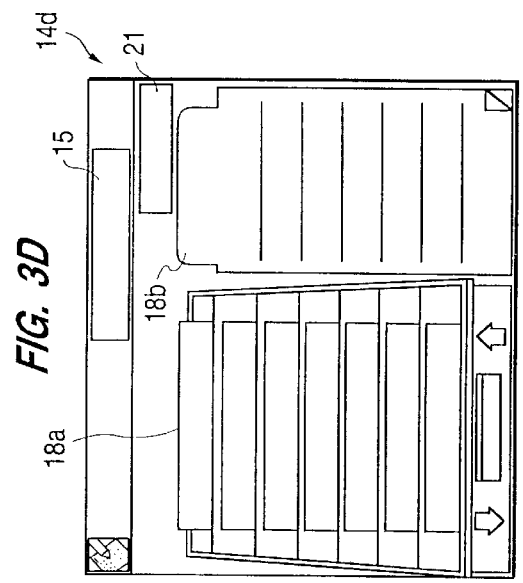
Figure 3B:
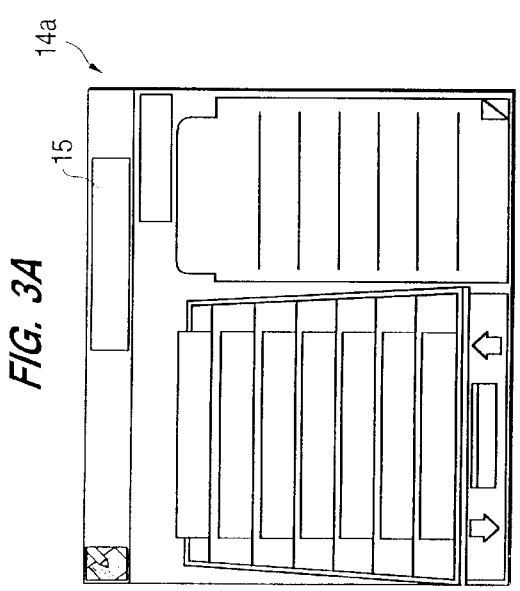

When the new input/form selecting button 15 of the display image 14a is indicated with the input pen 5, the display image 14b as shown in FIG. 3B will be displayed. This display image 14b is an image for selecting the form of report and displays icons 16a, 16b, 16c,—showing the forms of meeting minutes, diary, report on business trip, etc. respectively. The icons represent various predetermined processes in illustration, for example, in a way easy to understand and the selection of process can be made by indicating the desired icon with the input pen 5.

When an icon 16a for meeting minutes from among the icons 16a, 16b, 16c,—is selected, the image for preparing meeting minutes is displayed. For example, there appears an image having such items as registration name, reporting date, print title, etc. as a plurality of preset items as shown in FIG. 3C and the operator inputs some proper data in those items to prepare meeting minutes. When the data input is over, the operator indicates the registration button 17 with the input pen 5. When the registration button 17 is indicated, the prepared data file is stored in memory. The illustrated image is stored as registration name of "Aichou (=Bird) CF Plan" (愛鳥ＣＦ企画). When the edit button 19 is selected, editing operations such a movement, copying or deletion, etc. of input data are executed. When the stop button 20 is selected, the process under execution will be stopped.

Figure 3D:
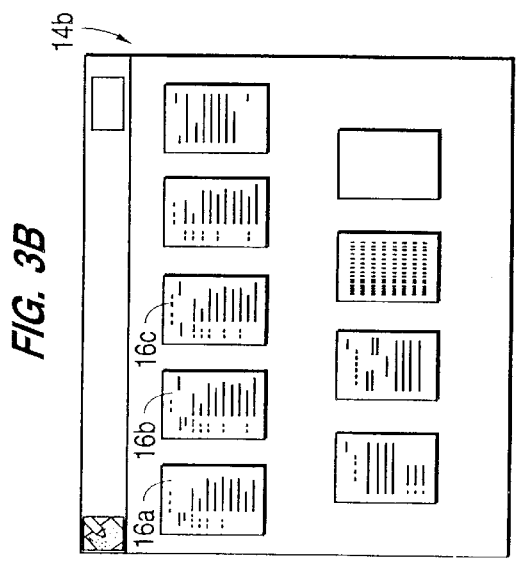
Figure 4:
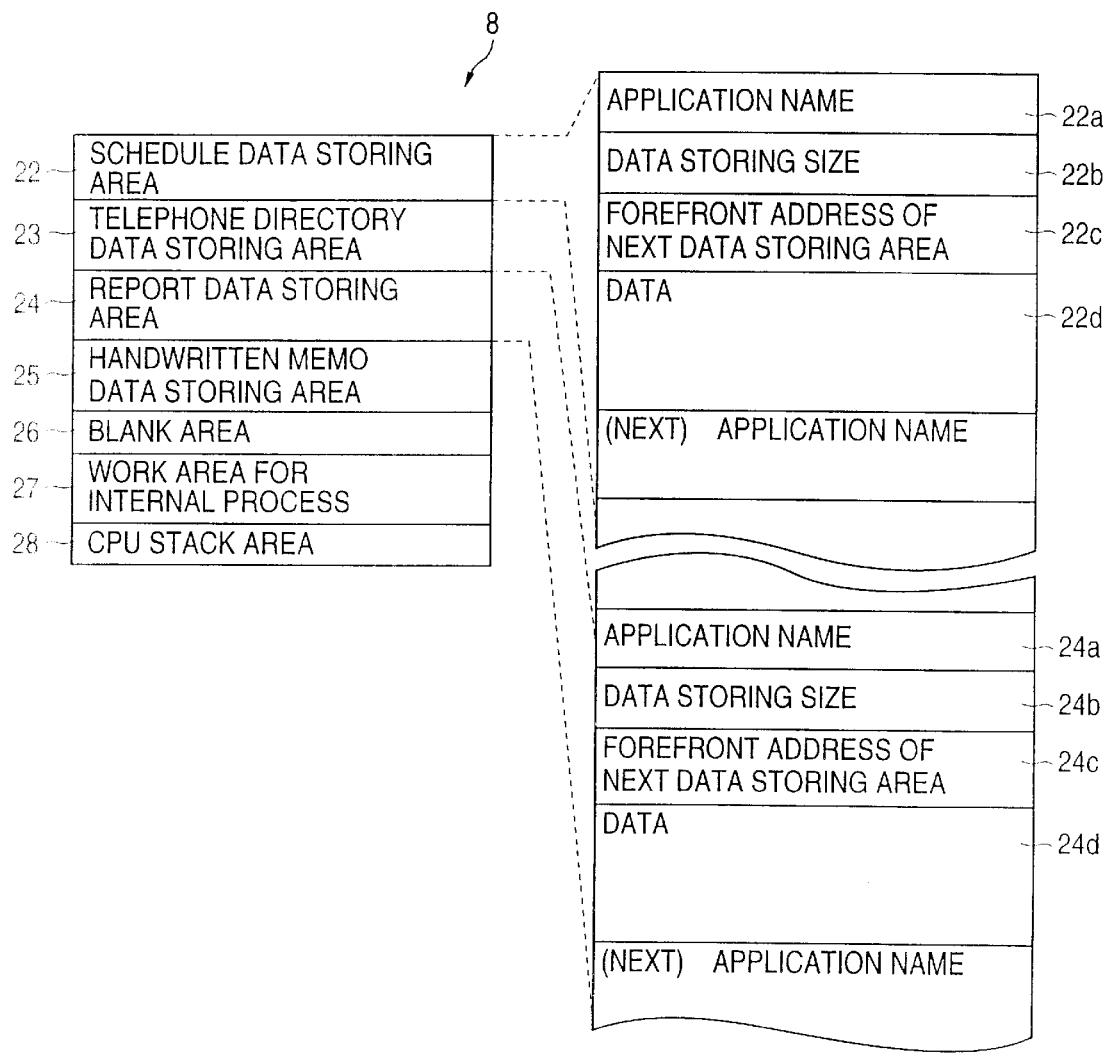
FIG. 4 is a drawing showing the constitution of a RAM 8.

When the registration is over, the display image 14d as shown in FIG. 3D, namely an image showing the registered file list, will be displayed. In the column 18a of the list on the left side of the illustrated image, the file names representing the major categories of the registered files are displayed. And the details of the files representing the major categories will be shown in the column 18b on the right side. The illustrated image indicates that the category is "Meeting minutes" and the registered data files as "Discussion on location on the lakeside" (湖畔ロケ打ち合) and "Aichou CF Plan" (愛鳥ＣＦ企画). To change the file name, the file name changing button 21is selected, and the process for changing the registered name will be executed. The RAM 8 is provided with a blank area 26, a work area for an internal process 27 and a CPU stack area 28 in addition to a schedule data storing area 22, a telephone directory data storing area 23, a report data storing area 24 and a handwritten memo data storing area 25 corresponding to the data file preparing function of the electronic apparatus 1.

For example, in the schedule data storing area 22, an area 22a for storing the application name which shows identification of the data file preparing function used for preparing the data file concerned, an area 22b for storing the data storing size, an area 22c for storing the forefront address of the next data storing area and an area 22d for storing the data file are provided in this order as data storing areas of one subject, and the plurality of data files to be stored are stored in order in the areas 22a–22d considered as a unit. The same is true also with the telephone directory data storing area 23, the report data storing area 24 and the handwritten memo data storing area 25. Therefore, the data file registered as "Aichou CF Plan" (愛鳥CF企画) mentioned above is stored in the areas 24a–24d, which is considered as a unit, of the report data storing area 24 corresponding to the areas 22a–22d, respectively.

Figure 5C:
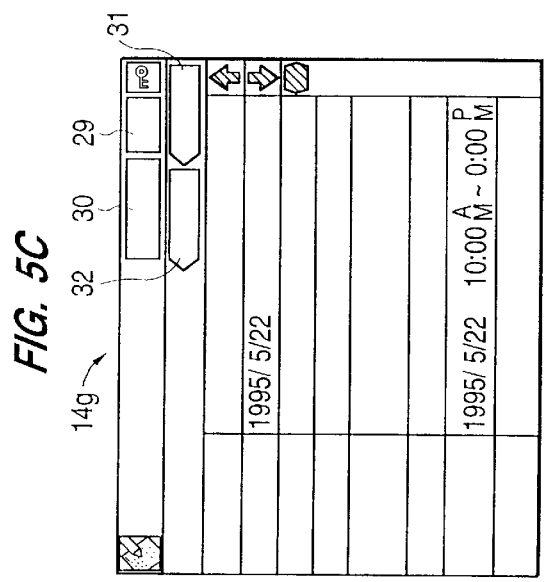
FIGS. 5A–5C are plan views showing in progressive steps the display image displayed at the time of reading of a registered data file.
Figure 5A:
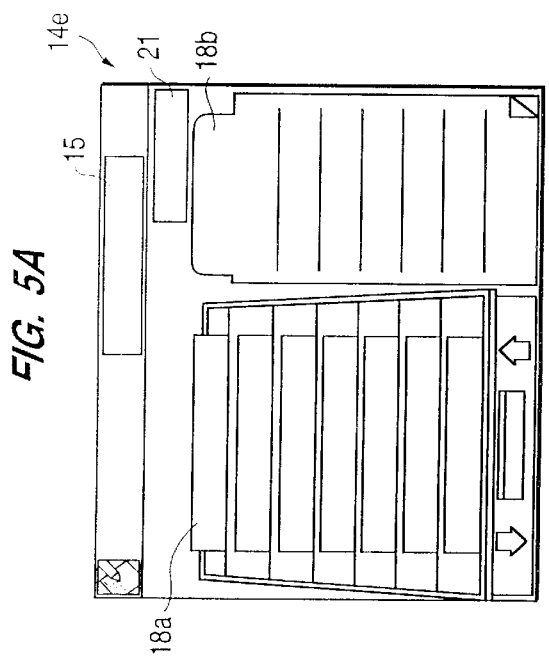
Figure 5B:
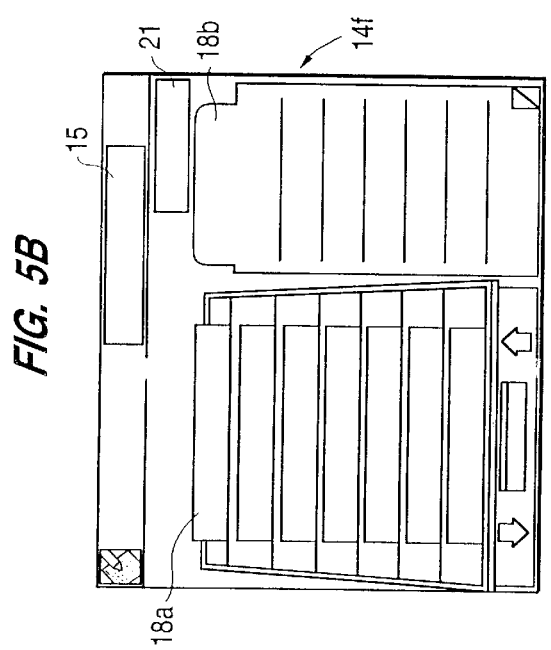

FIGS. 5A–5C are plan views showing in progressive steps a display image displayed at the time of reading of registered data file. For example, a case of reading out the data file having the registration name of "Aichou CF Plan" (愛鳥CF企画) under the category of "Meeting minutes" will be described. First, the report key 3c among the function selecting key unit 3 is selected and the display image 14e as shown in FIG. 5A is displayed. This display image 14e indicates the file name classifying the registered file list and this file name is displayed in the list column 18a. At that time, for example, all data stored in the report data storing area 24 of the RAM 8 is read out on the display memory 10.

Next, when the area including the display of "Meeting minutes" in the list column 18a is indicated with the input pen 5, the display image 14f as shown in FIG. 5B will be displayed. Namely, the registered names of the data files classified into the category of "Meeting minutes" will all be displayed in the list column 18b on the right side.

Furthermore, when the area including the display of "Aichou CF Plan" (愛鳥CF企画) in the list column 18b is indicated with the input pen 5, the display image 14g as shown in FIG. 5C will be displayed. Namely, from among the data read out on the memory 10 for display, the data file stored as "Aichou CF Plan" (愛鳥CF企画) is read out and displayed. When here, for example, the illustrated correction button 29 is indicated, an operation for correcting the data is executed. And when the new input button 30 is indicated, the initial image for performing new input of meeting minutes will be displayed. Moreover, when the title list button 31 is indicated, the display image 14f as shown in FIG. 5B will be displayed for example and, when the file list button 32 is indicated, some more detailed contents not displayed in the display image 14f such as reporting date, for example, will be displayed.

Figure 6A:
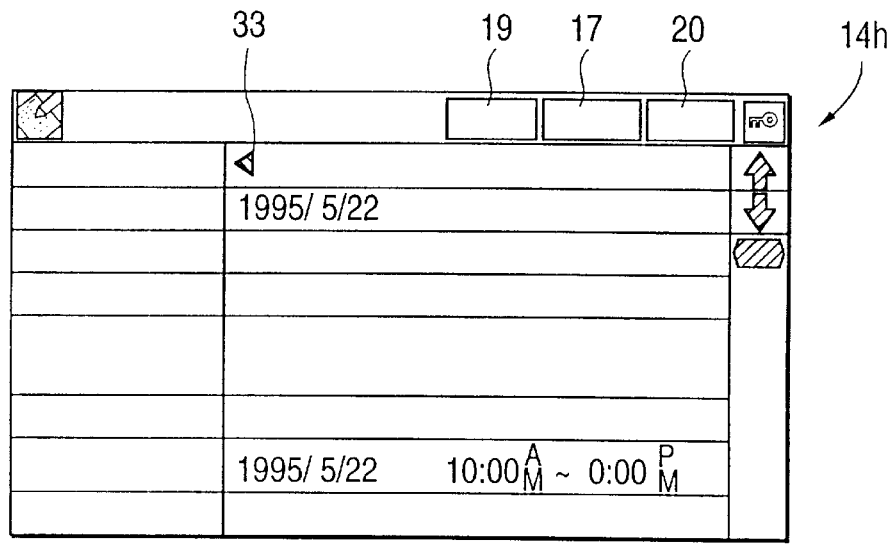
FIGS. 6A–6B are plan views showing in progressive steps a display image for explaining the method of inputting characters using an input board.
Figure 6B:
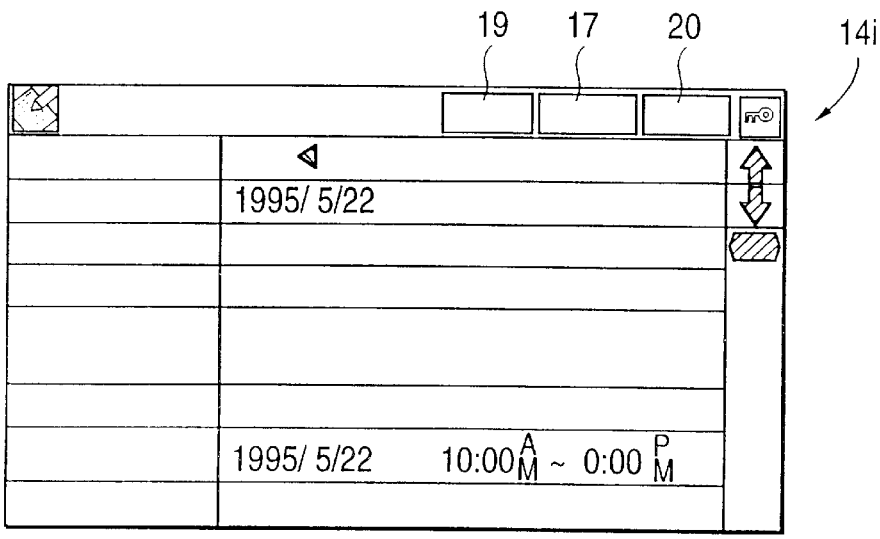
Figure 7A:
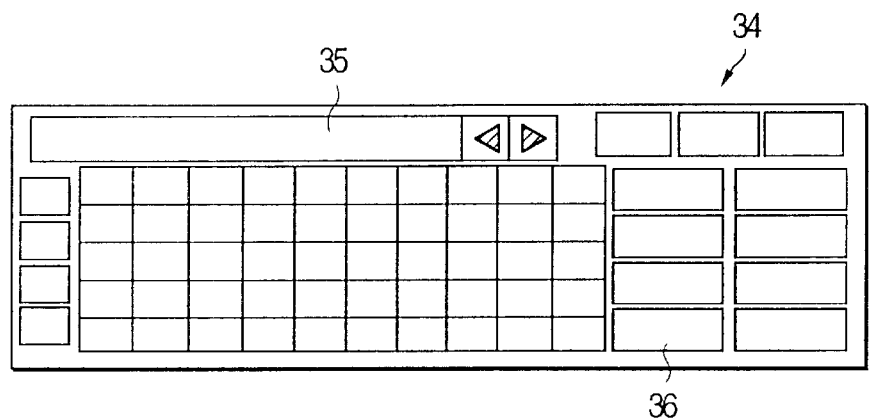
FIGS. 7A, 7B are plan views showing the input board 34.
Figure 7B:
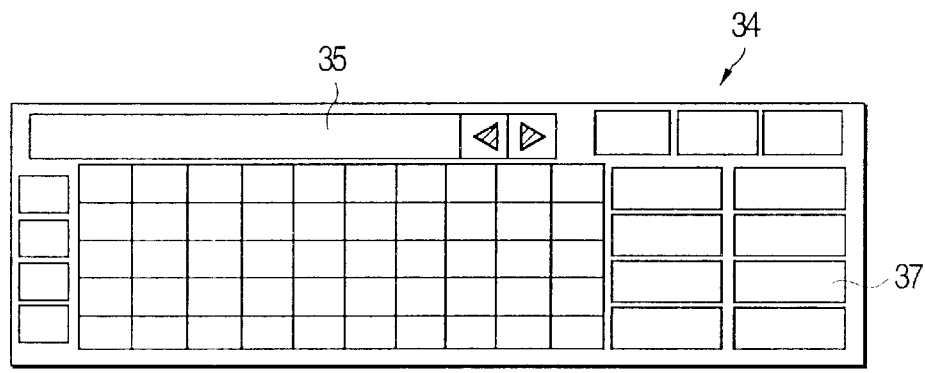

FIGS. 6A, 6B are plan views showing in progressive steps the display image for explaining the method of input of characters using input board and FIGS. 7A, 7B are plan views showing the input board 34 in the progressive steps. Here, explanation is given on an example of inputting as "Aichou" (愛鳥) in the item of registered name but other inputs of characters are made by the same method.

As shown in FIG. 6A, the cursor 33 is displayed at the head of the items of registration name. Characters are input in the position of this cursor 33. When characters are input, the input board 34 given in FIGS. 7A, B is displayed in the lower half of the display image 14h for example. The display of the input board 34 may be made, for example, automatically by the judgment of the CPU 6, or on the basis of the operator's instruction. The input board 34 is provided with a character key for instructing switching of input boards such as a typewriter input board and a punctuation input board to be provided off the illustrated 50-sound Japanese syllabary input board 34 and numeral key for indicating the display of numeral input board, in addition to 50-sound input keys indicated in "hiragana" for example, punctuation input keys, keys for indicating backspace, phonetic conversion, spacing, conversion to Chinese characters, deletion, line feed, adoption and input, etc. and display board 35 for displaying characters input from those keys.

For example, in the case where input in "hiragana" is selected and input as "aichou" (あいちょう) is conducted by using the 50-sound input keys and the half-width key, etc., the input characters are displayed on the display board 35 as shown in FIG. 7A. Next, when conversion to Chinese characters of "aichou" (あいちょう) input is instructed with the convert key 36, the Chinese characters registered with the reading of "aichou" are displayed on the display board 35 as shown in FIG. 7B. When adoption of the displayed "aichou (in Chinese characters)" (愛鳥) is instructed with the adopt key 37, then "aichou (in Chinese characters)" (愛鳥) will be input on the right side on the screen from the position of the cursor 33 and the display image 14i as shown in FIG. 6B will be displayed.

FIGS. 8A–8D and FIG. 9 are plan views showing the input board provided on the electronic apparatus 1. While 5 different kinds of input board are indicated in FIGS. 8A–8D and FIG. 9, the kinds of input board are not limited to those given here but other types such as board for words of normal usage for inputting frequently used words, etc., user dictionary board for inputting words registered by the operator himself, etc. are also provided.

Figure 8A:
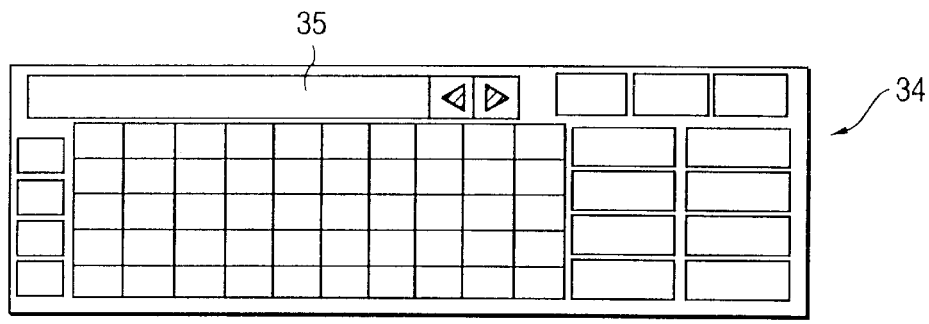
FIGS. 8A–8D are plan views showing the input board provided on the electronic apparatus 1.

FIG. 8A is a plan view showing the 50-sound input board 34. By instructing the 50-sound key with the input pen 5 according to the reading of the Japanese syllabary, "hiragana", "katakana" and "kanji" (=Chinese characters), etc. may be input. The input characters are displayed on the display board 35.

Figure 8B:
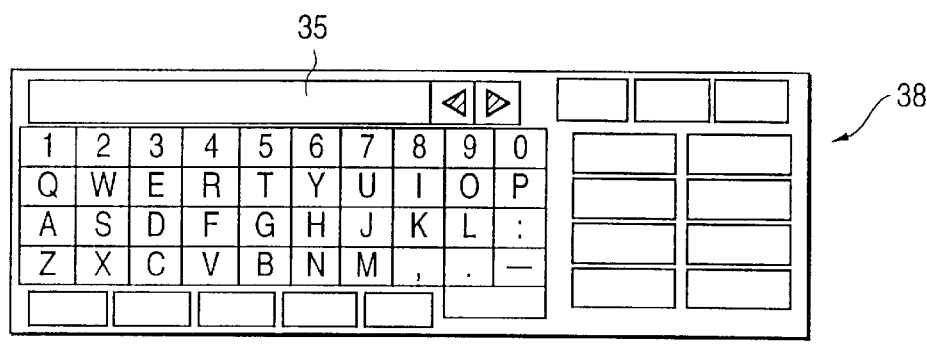

FIG. 8B is a plan view showing the typewriter input board 38. The input keys in alphabet are arranged in the same way as on an English typewriter, and "hiragana", "katakana", "kanji", "romaji" (=Roman characters), numerals, etc. may be input with input in Roman characters. The inputted characters are displayed on the display board 35 similar to the display board 34.

Figure 8C:
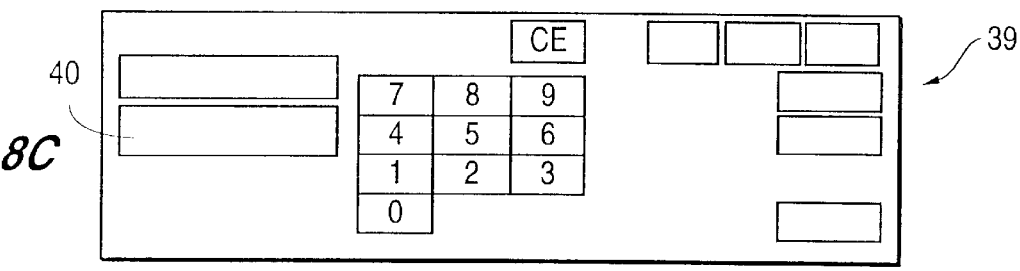

FIG. 8C is a plan view showing the punctuation input board 39. With this input board, 2-byte Chinese characters of Japanese Industrial Standards (JIS) Level 1 & Level 2, symbols and Greek characters, etc. may be inputted with the punctuation codes determined in advance in corresponding to the respective characters. The input punctuation codes are displayed on the display board 40 for displaying punctuation codes.

Figure 8D:
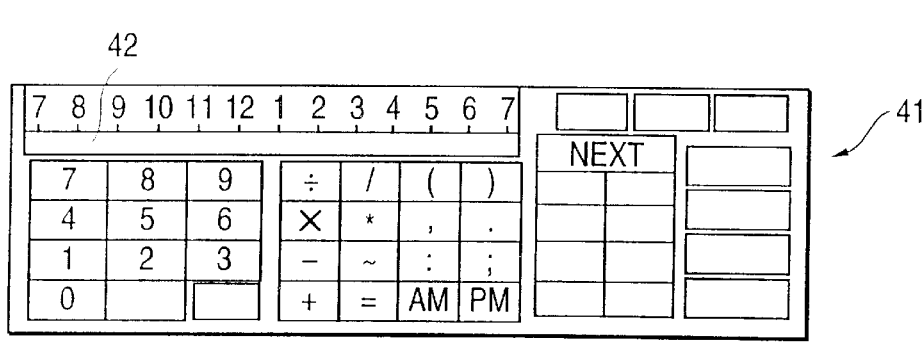

FIG. 8D is a plan view showing the numeral input board 41. The input board 41 is provided with the functions of ten keys used for large electronic apparatus and is available for inputting numerals, time, etc. It is also provided with a display board 42 which enables easy input of time zone.

Figure 9:
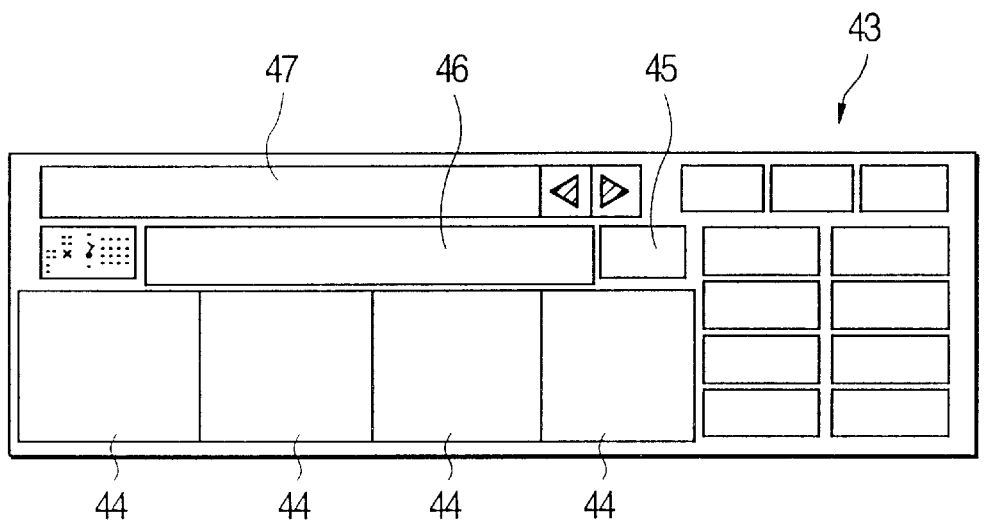
FIG. 9 is a plan view showing a board 43 wherein inputting is conducted in handwriting (hereinafter described as handwritten input board)

FIG. 9 is a plan view showing a handwriting input board 43. The input boards 34, 38, 39 and 41 are intended for inputting characters by such methods as inputting reading from input keys or inputting punctuation codes, etc. By using the handwriting input board 43, characters which you wish to input with the use of the input pen 5 may be input in handwriting. The handwriting input board 43 is provided with an entry frame 44 and the characters which you wish to input in this frame are entered. When the recognition key 45 is instructed, the recognition of characters corresponding to the characters input in handwriting is executed. The candidate characters corresponding to the characters input in handwriting are displayed on the illustrated candidate character display board 46 for example and, when the desired character is selected from among the displayed characters, the selected character will be displayed on the display board 47.

What is to be noted about the present invention is that it is provided with a function of pasting data file prepared by the data file preparing means in data file prepared by some other data file preparing means, a function of automatically switching the keys of the input board in correspondence to the process under execution and a function of automatically recognizing image data of handwritten input as characters. Now, let us explain those 3 functions in detail hereafter.

Pasting function which is the first function of the present invention is a function of pasting data file prepared by the data file preparing means in data file prepared by some other data file preparing means as mentioned above. Here, we will explain for example a case where a data file named "Guide map" prepared by the handwritten memo function for preparation illustration, diagram, etc. is pasted in a data file named "FAX transmission" prepared by the reporting function.

Figure 10A:
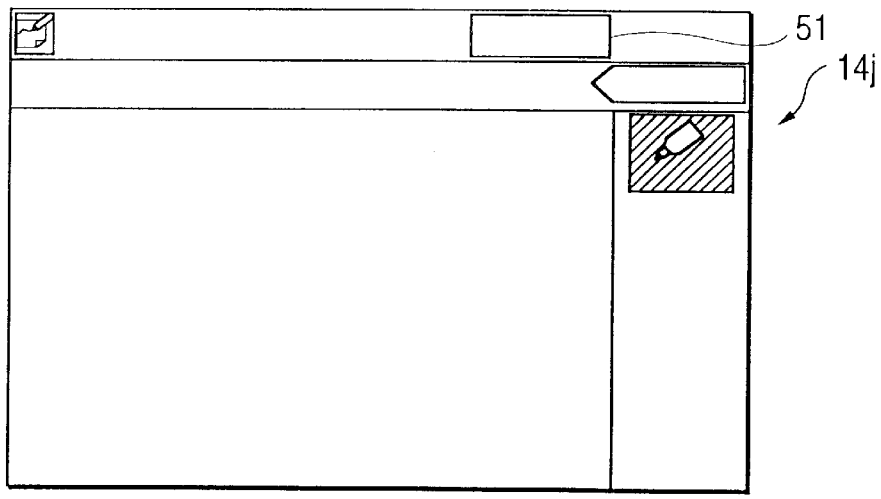
FIGS. 10A–10C are plan views showing in progressive steps a display image displayed at the time of preparation of a data file "Guide map" by using the handwritten memo function.
Figure 10B:
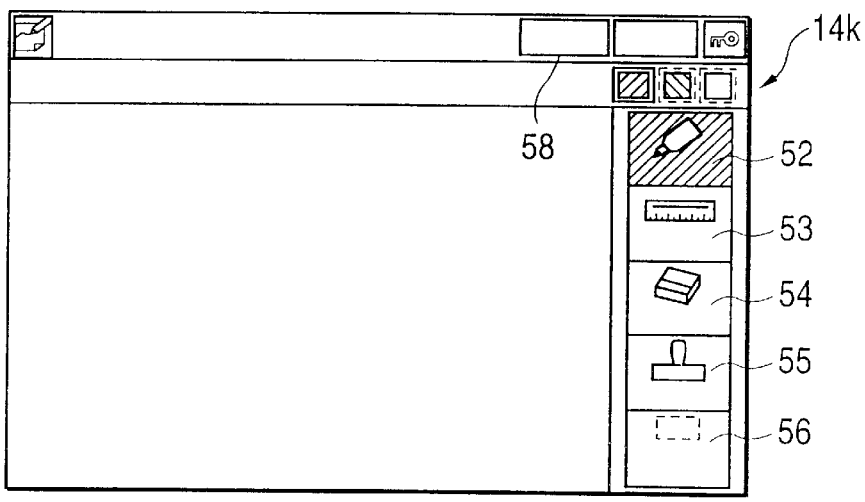
Figure 10C:
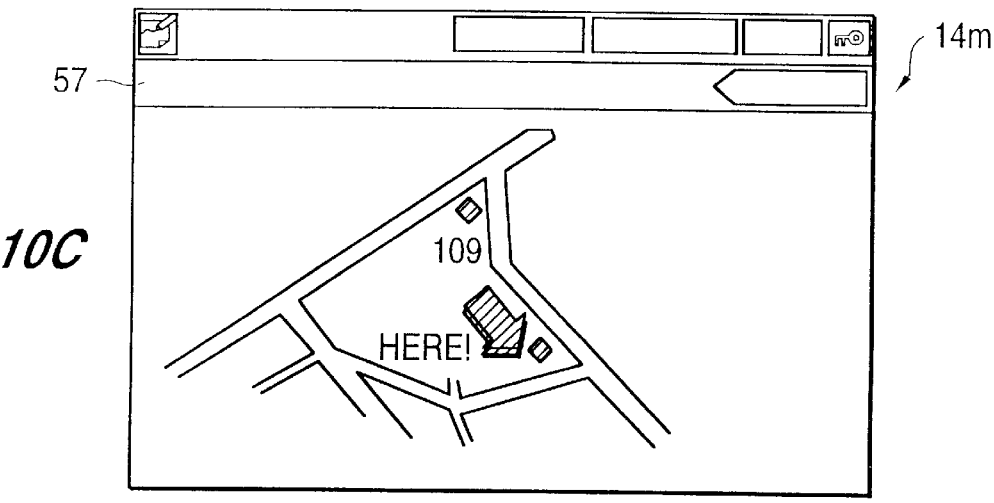

FIGS. 10A–10C are plan views showing in progressive steps the display image displayed at the time of preparation of "Guide map" by using the handwritten memo function. The handwritten memo key 3d in the function selecting key unit 3 is selected and the display image 14j as shown in FIG. 10A is displayed. This display image 14j indicates the initial picture for performing input of handwritten memo. When the new input button 51 in the display image 14j is indicated with the input pen 5, the display image 14k as shown in FIG. 10B is displayed. This display image 14k indicates a picture for performing new input and displays a pencil icon 52 for specifying the size of drawn line, a scale icon 53 for specifying straight line, an eraser icon 54 for specifying erasure of drawn line, a stamp icon 55 for specifying input of figure representing building, etc. and an edit frame icon 56 for specifying movement or copying of figure or character, etc. The operator prepares illustrations and figures by using those icons 52–56. For example, when the operator prepares a map as shown in FIG. 10C, inputs characters as "Guide map" in the title column 57 and indicates the registration button 58 with the input pen 5, the map prepared will be stored under the registration name of "Guide map" and the display image 14m as shown in FIG. 10C will be displayed. The data inputted by handwritten memo this way is stored as a single data file having the registration name of "Guide map" in the handwritten memo data storing area 25 of the RAM 8.

Figure 11C:
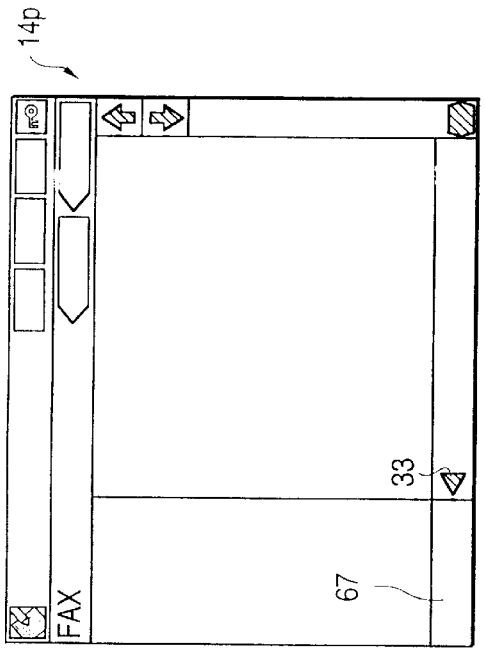
FIGS. 11A–11D are plan views showing in progressive steps a display image displayed when the data file "Guide map" is pasted in the data file "Fax transmission"
Figure 11D:
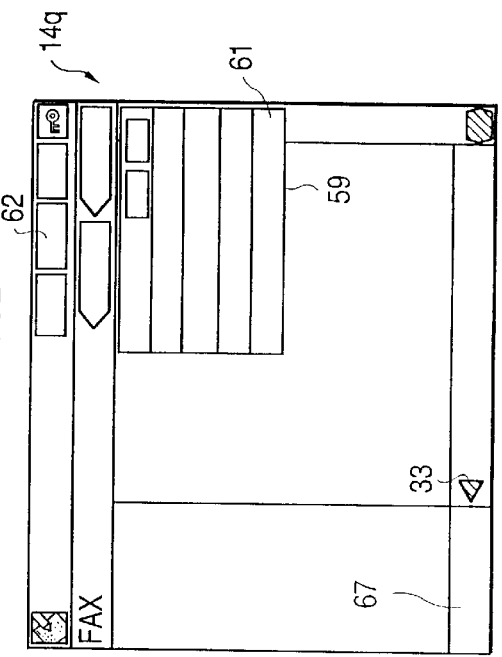
Figure 11A:
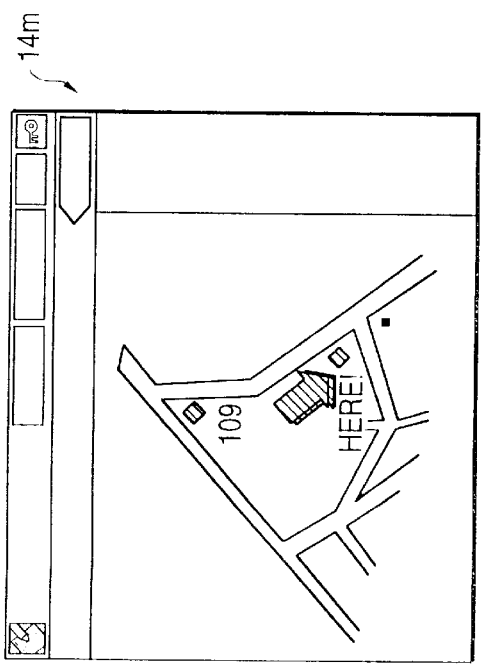
Figure 11B:
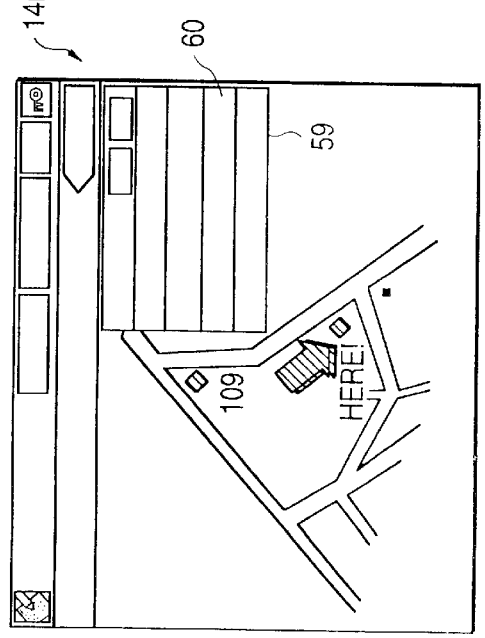

FIGS. 11A–11D are plan views showing in progressive steps the display image displayed when the data file "Guide map" is pasted in the data file "Fax transmission". First, the data file named "Guide map" prepared by the procedure described above is displayed as shown in FIG. 11A. This data file is read out and displayed according to the reading procedure of registered data files explained earlier. Next, the menu key 4 indicating an operation other than that of the button displayed according to the respective display images is indicated. By instructing the menu key 4, the menu picture 59 as shown in FIG. 11B is displayed on the display image 14m to become display image 14n. The menu picture 59 displays delete, cut, copy, paste buttons, etc. and the operation of the respective buttons is executed by instructing the desired button with the input pen 5. For pasting, the copy button 60 is selected first.

Next, the data file named "Fax transmission" in which the data file "Guide map" is to be pasted is displayed. The data file "Fax transmission", which is prepared by the report preparing function in the same way as that explained above, is read out and displayed according to the read-out procedure of registered data files explained above. After instructing correction from the correction button, you display the cursor 33 in the position where to insert "Guide map" in the prepared "Fax transmission" to obtain the display image 14p indicated in FIG. 11C. In this embodiment, the cursor 33 is displayed in item 67 named "Memo". When further the menu key 4 to display the menu picture 59 as shown in the display image 14q of FIG. 11D is instructed and the paste button 61 is selected, pasting instructing data indicating pasting of the data file "Guide map" on the right side on the drawing from the position of the cursor 33 is inputted. When further registration from the registration button 62 is instructed, a data file named "Fax transmission" in which the pasting instructing data is inputted is newly stored. At that time, the previous data file "Fax transmission" stored with an input of pasting instructing data is erased. The operator performs pasting with the operations explained above.

Figure 12:
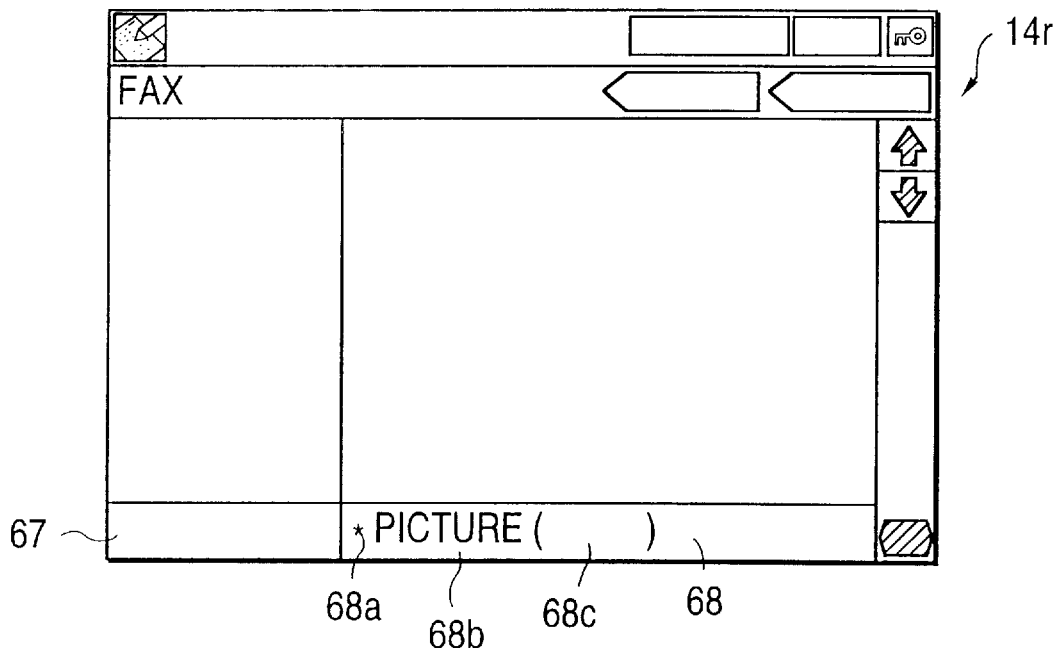
FIG. 12 is a plan view showing a display image 14r obtained after pasting.

FIG. 12 is a plan view showing the display image 14r obtained after execution of the pasting. When the pasting operation is over, a display image 14r indicating pasting instructing data 68 from the position of the cursor 33 on the right side on the screen is obtained. The pasting instructing data 68 is constructed by including character 68a showing a specific process (pasting in this case) ("*" here), character 68b showing with which data file preparing function the data file to be pasted was prepared ("PICTURE" here) and registration name 68c showing the data file to be pasted ("Guide map" here). From the display of the pasting instructing data 68, we can see that a data file named "Guide map" prepared with the handwritten memo function is pasted. The pasting instructing data 68 is automatically inputted by a pasting operation to be described below. Because pasting instructing data 68 is input in the position where pasting has been made in this embodiment as explained above, there is no fear of losing consistency of display, making it possible for the operator to easily recognize the function under execution (report function in this case) by just looking at the screen.

Figure 13:
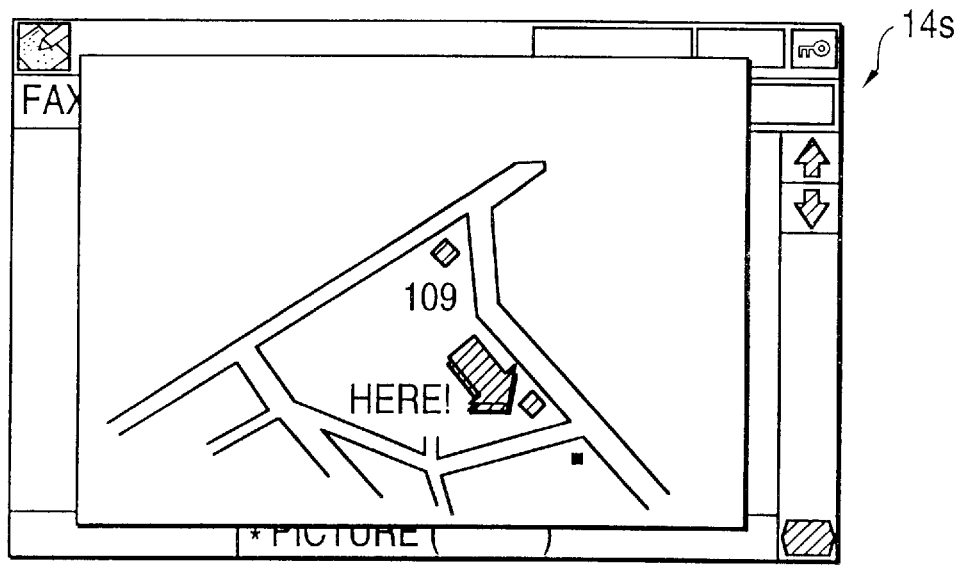
FIG. 13 is a plan view showing a display image 14s at the time when the pasted data file "Guide map" is displayed.

FIG. 13 is a plan view showing the display image 14s at the time when the pasted data file "Guide map" is displayed. By instructing the area including the display of pasting instructing data 68 with the input pen 5, the display image 14s showing the data file "Guide map" on the display image 14r is obtained. Moreover, by instructing some image other than the displayed data file "Guide map" at this time with the input pen 5, the display of the data file "Guide map" may be erased and the display image 14r as shown in FIG. 12 is displayed.

Figure 14:
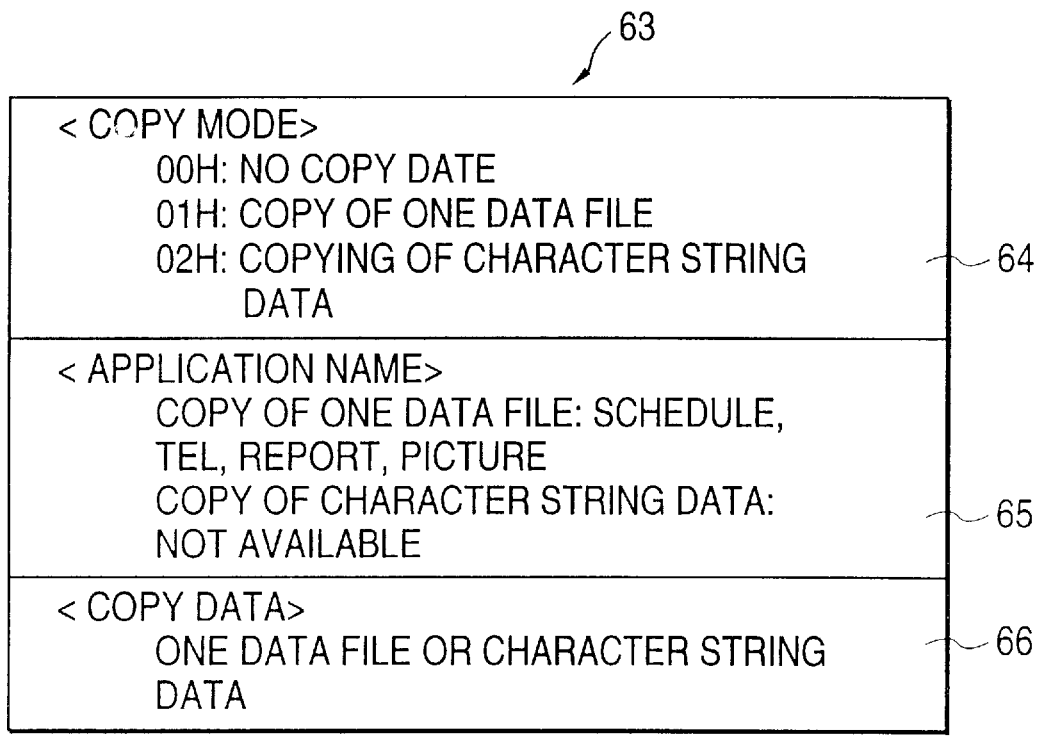
FIG. 14 is a drawing showing the constitution of a copy buffer 63.

FIG. 14 is a drawing showing the structure of the copy buffer 63. The copy buffer 63 is set in the work area 27, for example, for internal processing of the RAM 8 and the data stored in the copy buffer 63 is composed of identification code showing the kind of copy, application name and copy data. The identification code is stored in the identification code storing area 64, and code "00H" for example indicates absence of copy data, code "01H" indicates copying of one data file and code "02H" or higher show copying of character string data. "H" in those codes represents hexadecimal. The application name is stored in the application name storing area 65. This storing area 65 is set only in the case where a single data file is copied but is not set when copying character string data. For example, "SCHEDULE" indicates that the data file to be copied was prepared with the schedule function, "TEL" indicates that the data file was prepared with the telephone directory function, "REPORT" indicates that the data file was prepared with the report function and "PICTURE" indicates that the data file to be copied was prepared with the handwritten memo function. The copy data is stored in the copy data storing area 66.

Figure 15:
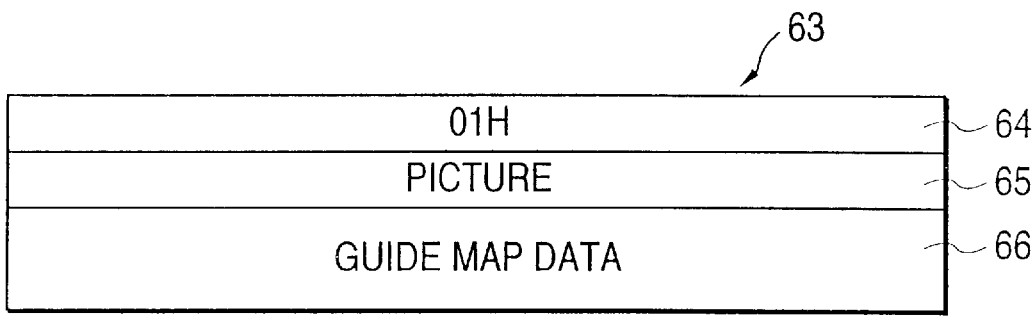
FIG. 15 is a drawing showing the copy buffer 63 in pasting of the data file "Guide map" prepared by the handwritten memo function.

When pasting data file "Guide map" prepared with the handwritten memo function, the copy buffer 63 becomes as shown in FIG. 15. Namely, "01H" is stored in the identification code storing area 64, "PICTURE" is stored in the application name storing area 65 and the data file "Guide map" is stored in the copy data storing area 66 respectively.

Figure 16:
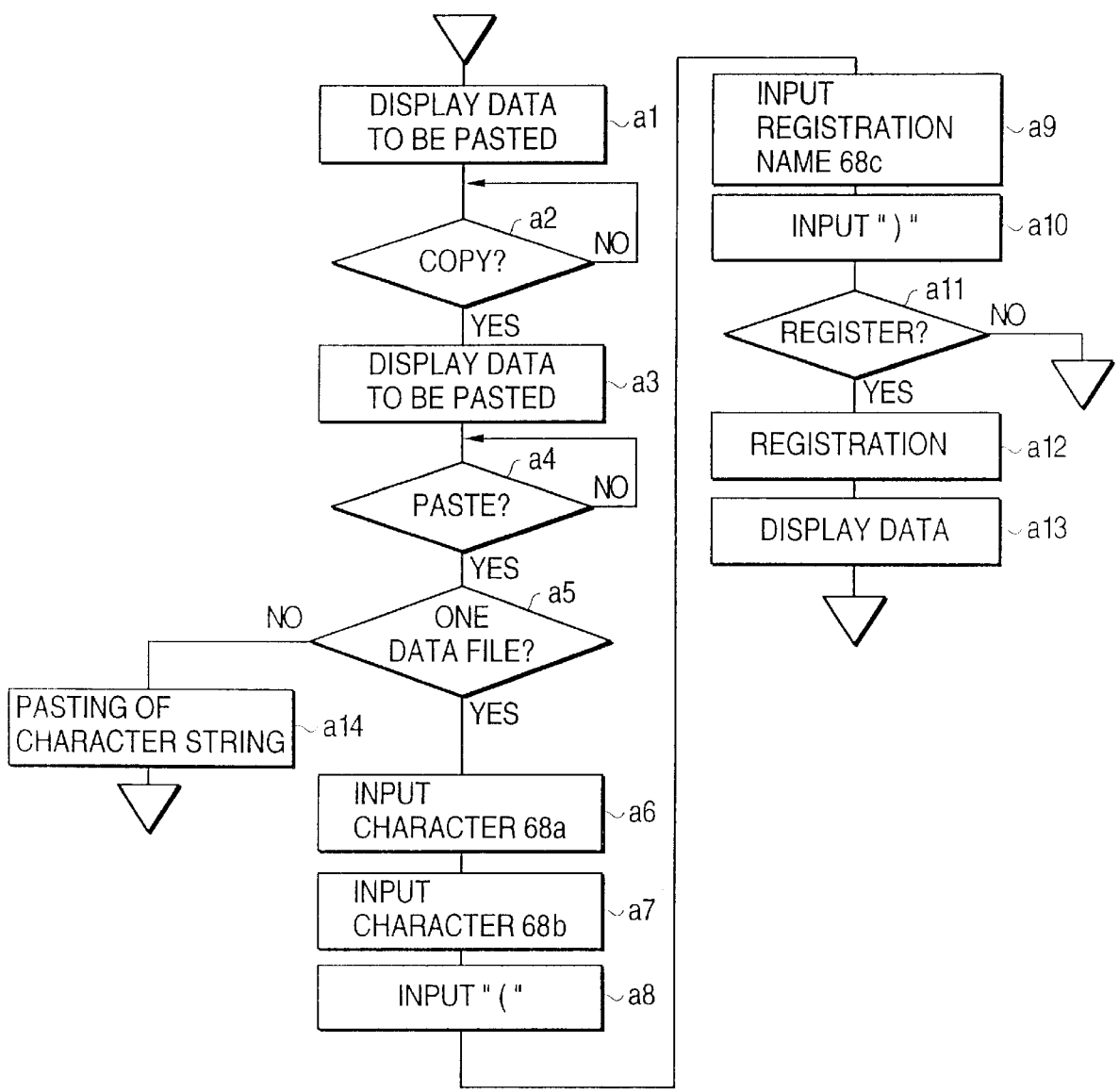
FIG. 16 is a flow chart showing a pasting operation.

FIG. 16 is a flow chart showing the pasting operation. In step a1, the data file to be pasted i.e. data file "Guide map" is read out from the RAM 8 and the display image 14m as shown in FIG. 11A is displayed. At that time, the operator reads out the data file according to the readout procedure of registered data file. In step a2, judgment is made whether the copy button 60 of the display image 14n indicated in FIG. 11B was instructed or not. The CPU 6 will pass to step a3 if it judges that the copy button 60 was instructed for copying but will remain on standby in step a2 when it judges that the copy button 60 was not instructed hence it is not a case of copying. When copying is instructed, the data file "Guide map" is stored in the copy buffer 63. In step a3, the data file to be pasted i.e. the data file "Fax transmission" is read out from the RAM 8. At that time, the operator reads out the data file according to the readout procedure of the registered data file. He also displays the cursor 33 as shown in FIG. 11C. In step a4, judgment is made whether the paste button 61 of the display image 14q indicated in FIG. 11D was instructed or not. The CPU 6 will pass to step a5 if it judges that the paste button 61 was instructed for pasting but will remain on standby in step a4 when it judges that the paste button 61 was not instructed hence it is not a case of pasting. In step a5, judgment is made whether the data file to be pasted is a single data file or not. The CPU 6 will pass to step a6 if it judges that the data file to be pasted is a single data file but will pass to step a14 if it judges that the data file to be pasted is not a single data file i.e. it is a case of pasting of character string, and perform pasting of character string.

The judgment of whether the data file to be pasted is a single data file or character string made by the identification code. This identification code is selected, in step a2, depending on whether or not the operator specified the character string to be pasted before instructing the copying. In the case where the operator specified the character string and then instructed copying, it is judged that the data to be pasted is character string data and "02H" is inputted. When the operator instructed copying without specifying character string, it is judged that the data to be pasted is a single data file and "01H" is inputted.

In step a6, character 68a representing a specific process i.e. "*" indicating pasting is input in the position of the cursor 33. In step a7, character 68b indicating with which data file preparing function the data file to be pasted was prepared i.e. "PICTURE" is inputted following the character 68a. In step a8, "(" is inputted following the character 68b. In step a9, the registration name 68c of the data file to be pasted i.e. "Guide map" is inputted following "(". In step a10, ")" is input following the registration name 68c. With the motions of the steps a6 to a10, the pasting instructing data 68 is input. This operation is made automatically with the control of the CPU 6 and there is no need of input of characters by the operator.

In step a11, judgment is made whether or not the registration button 62 indicated in FIG. 11D was instructed by the operator for registration. The CPU 6 will pass to step a12 if it judges that registration was instructed but pass to another operation if it judges that no instruction of registration was given. In step a12, the data is stored according to the operator's instruction for registration. Namely, the data file in which the pasting instructing data 68 is inputted is newly stored in the RAM 8 under the registration name of "Fax transmission". In step a13, the registered data file is displayed and the display image 14r as shown in FIG. 12 is displayed.

FIGS. 17A, B are drawings showing part of the data newly stored as "Fax transmission" after the end of the pasting operation. Based on the embodiment, as shown in FIGS. 17A, B, the character code "Memo" 110 is followed by tab data 111 instructing setting of a space for prescribed number of characters, character code 112 indicating characters 68b "PICTURE", character code 113 indicating "(", character code 114 indicating registration name 68c "Guide map" and character code 115 indicating ")" which are input in this order. The CPU 6 judges whether or not the character code 112 which is inputted between the tab data 111 and the character code 113 indicating "(" agrees with the character code indicating the respective application names inputted in areas 22a–25a of the data storing areas 22–25 of the RAM 8 and, if it judges that they agree with each other, recognizes pasting of a data file and also recognizes with which function the data file to be pasted was prepared. It also judges the character code 114 between the character code 113 indicating "(" and the character code 115 as registration name. On the other hand, if there is no agreement, the CPU 6 judges that it is not a case of pasting of a data file. Moreover, it is also possible to set the number of characters of the characters 68b within a predetermined number or within 10 characters for example and judge if the character code 113 indicating "(" exists or not within 10 characters after the tab data 111 and recognize that it is not a case of pasting of a data file if the character code 113 is not found there.

The character code 112 indicating characters 68b "PICTURE" may be omitted and, in that case, the data will become as shown in FIG. 17B. Namely, the character code "Memo" 110 is followed by tab data 111, character code 113 indicating "(", character code 114 indicating registration name 68c "Guide map", character code 115 indicating ")" and character code 116 indicating "," which are input in this order. At that time, the CPU 6 recognizes the registration name of the data file to be pasted from the character codes 113–115 existing between the tab data 111 and the character code 116 indicating ",". It also displays "(Guide map)" on the screen.

In this way, the data which is stored after the end of the pasting operation includes the pasting instructing data 68 only. This makes it possible to reduce the storing area because the volume of data to be stored in the RAM 8 which is a data file storage becomes smaller, compared with the case in which all data to be pasted are stored.

FIG. 18 is a drawing showing respective applications and the display showing the pasting corresponding to them. The example given above is an example of pasting of data file prepared with the handwritten memo function. In the case where any data file prepared with some other application i.e. schedule, telephone director or report function is pasted, the character 68b will become "SCHEDULE", "TEL" or "REPORT" instead of the illustrated "PICTURE" and the registration name of the data file to be pasted will be displayed in the parentheses.

Figure 19:
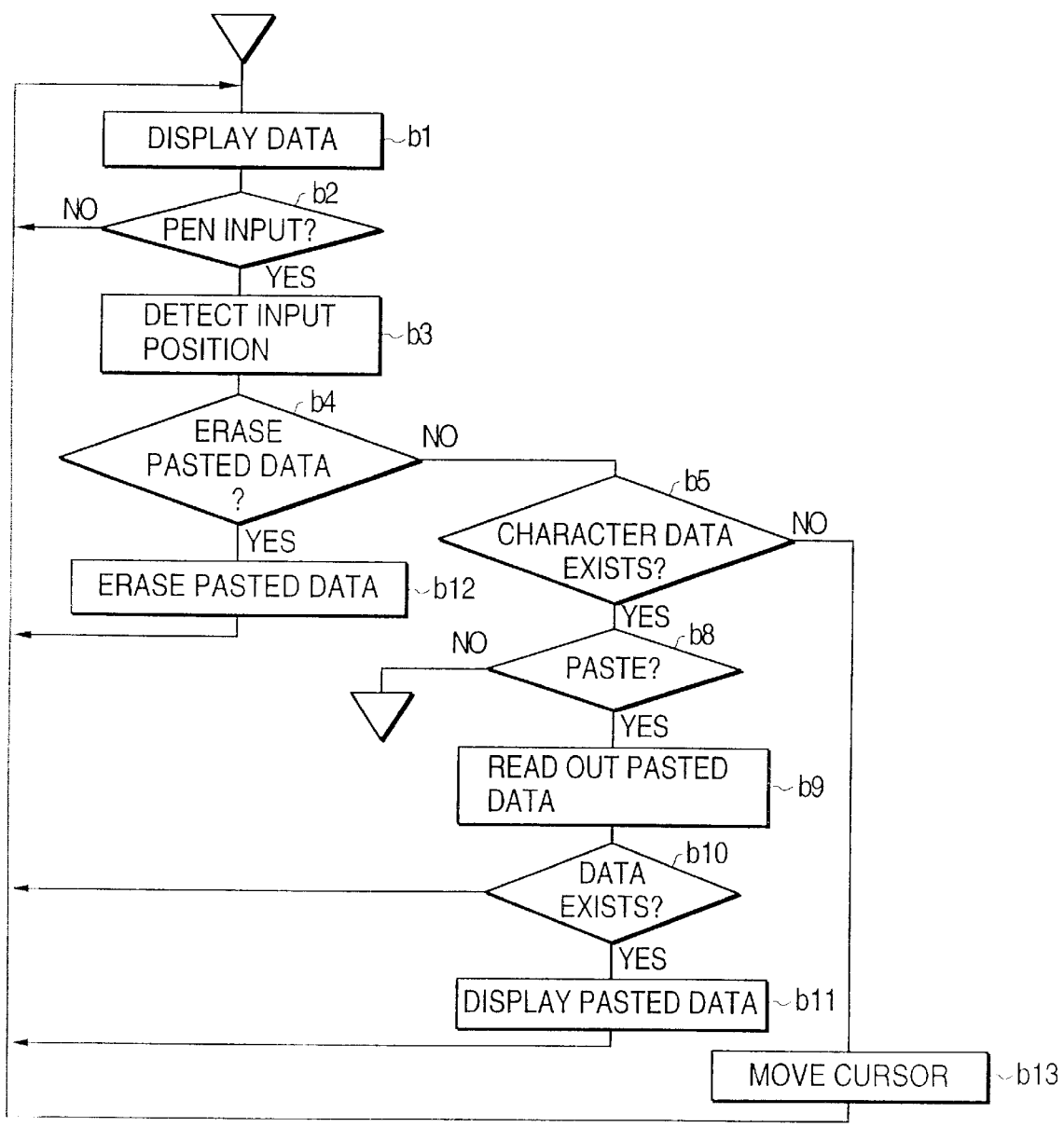
FIG. 19 is a flow chart showing the operation at the time of displaying the pasting data file after the end of the pasting operation.

FIG. 19 is a flow chart showing the operation at the time of displaying of the pasting data file after the end of the pasting operation. In step b1, the data file in which the pasting instructing data 68 indicating pasting of a data file prepared with other data file preparers with the pasting operation, namely the data file newly registered as "Fax transmission" is displayed as shown in FIG. 12. In step b2, judgment is made whether there was an input from the input pen 5 or not, and the CPU 6 moves to step b3 if it judges that there was an input but returns to step b1 if it judges that there was no such input. In step b3, the position of input from the input pen 5 is detected. In step b4, judgment is made whether the instruction from the input pen 5 is erasure of pasted data or not based on the detected position. If it judges that it is a case of erasure of pasted data, the CPU 6 will move to step b12, erase the pasted data as shown in FIG. 13, and after displaying the display image 14r as shown in FIG. 12, return to step b1. If it judges that it is not a case of erasure of pasted data, the CPU 6 will move to step b5 and judge whether or not there is any character data in the position of the input made with the input pen 5. The CPU 6 will move to step b8 if it judges that there is some character data there but will move to b13 and return to step b1 by moving the cursor 33 to the indicated position if it judges that there is no character data.

In step b8, judgment is made whether or not the character data in the input position is pasting indicating data. The CPU 6 will move to step b9 if it judges that the data indicates pasting but performs some other action if it judges that it is not pasting indicating data. In step b9, the pasted data file is read out. Namely, the data file registered with the registration name of "Guide map" is read out. In step b10, judgment is made whether or not there is any data in the "Guide map" which is read out, and the CPU 6 will move to step b11 if it judges that there is some data there but will return to step b1 if it judges that there is no data there. In step b11, the read out data file is displayed and the display image 14s as shown in FIG. 13 is displayed. The CPU 6 will return to step b1 when the operation of step b11 is over.

The instruction for display of pasted data file can be given by indicating, with the input pen 5, a desired point in prescribed area including the display of the pasting instructing data 68. Moreover, it can also be made by indicating the prescribed area linearly with the input pen 5. Indication with other methods is also possible. For example, the instruction by indicating the item 67 "Memo" with the input pen 5 can be given. In that case, the CPU 6 judges whether or not the pasting instructing data 68 exists in the area corresponding to the item 67 and, if it judges that there exists the pasting instructing data 68, reads out the pasted data file and displays it. On the other hand, if the pasting instructing data 68 does not exist, the CPU 6 judges that there is no data to be pasted and makes no display.

By connecting a print output means to the electronic apparatus 1 of the present invention, it becomes possible to print out the inputted data. Any data submitted to the pasting described above can also be printed out in the same way, and in that case, by providing a selection key for selecting printing out, the printing out of the pasted data file can be carried out on the basis of the operator's instruction. For example, in the case of the data file "Guide map" mentioned above, if instruction is given for print out, the CPU 6 makes a line feed before the pasting instructing data 68 and then reads out the data file "Guide map" for printing out. When the output of "Guide map" is over, the CPU 6 makes a line feed and prints the content after the pasting instructing data 68. If instruction is given for not making any print out, the CPU 6 prints out only "Guide map" in parentheses.

Next, let us explain the second function of the present invention. The second function is a function for automatically switching the kind of keys of the input keyboard in correspondence to the process under execution. For an example, we will explain hereafter automatic switching of keys in the case where characters are inputted with the use of the typewriter board 38.

Figures 20A, 20B, 20C, 20D:
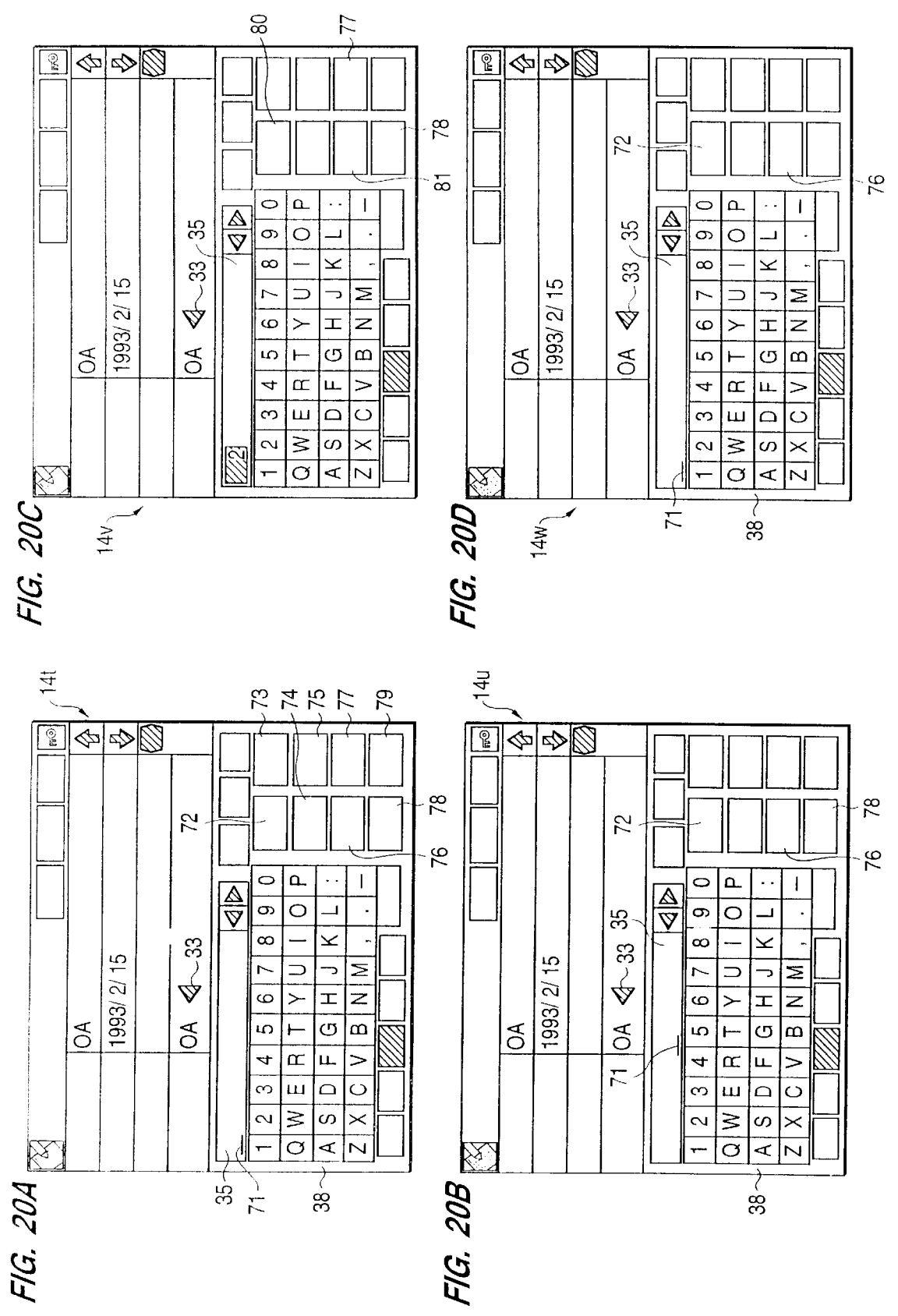

FIGS. 20A–20D are plan views showing in progressive steps the display image displayed at the time of inputting of characters made by using the typewriter input board 38. To input as "shoudan (in Chinese characters)" (商談) at the position of the cursor 33, for example, the typewriter input board 38 is displayed in the lower half of the screen and the display image 14t as shown in FIG. 20A is displayed. In addition to display board 35 and a plurality of alphabet input keys, the typewriter input board 38 is provided with backspace key 72, delete key 73, phonetic key 74, line feed key 75, space key 76, adopt key 77, convert key 78 and input key 79. Moreover, a cancel key 80 and a preceding candidate key 81 are disposed with switching of the backspace key 72 and the space key 76. The cursor 71 is displayed on the display board 35.

When "SHOUDAN" is input in Roman characters, the display image 14u showing "shoudan (in hiragana)" (しょうだん) is displayed on the right side on the screen from the position of the cursor 71 of the display board 35 as shown in FIG. 20B. At that time, when, for example, the backspace key 72 is indicated with the input pen 5, the cursor 71 displayed after "shoudan (in hiragana)" (しょうだん) moves under "n" (ん) to enable some new input instead of "n" (ん). Moreover, when the space key 76 is indicated with the input pen 5, the cursor 71 will move to the right by a space for one character to insert a space after "n" (ん). When the convert key 78 is indicated, the input "shoudan" (しょうだん) will be converted into Chinese characters and the display image 14v showing "2 shoudan (Chinese characters" (商談) will be displayed on the display board 35 as shown in FIG. 20C. The figure "2" indicates that there are two candidate Chinese characters registered with the reading of "shoudan" (しょうだん). After the conversion to Chinese characters, the cancel key 80 and the preceding candidate key 81 will be displayed in place of the backspace key 72 and the space key 76 because the latters are no longer used. For example, when the preceding candidate key 81 is indicated with the input pen 5, another candidate will be displayed in place of "2 shoudan (Chinese characters)" (商談). When the cancel key 80 is indicated, the display "2 shoudan (Chinese characters)" (商談) will disappear and the display image 14t as shown in FIG. 20A will be shown. When the adopt key 77 is indicated, "shoudan (Chinese characters)" (商談) will be input in the position of the cursor 33 and the display image 14w as shown in FIG. 20D in which only the cursor 71 is displayed on the display board 35 is obtained. At that time, the cancel key 80 and the preceding candidate key 81 will turn into the backspace key 72 and the space key 76 again.

As we have seen above, the kind of keys of the input board of the electronic apparatus 1 of the present invention is automatically switched in correspondence to the process under execution. Therefore, it becomes possible to reduce the kinds of keys to be displayed and increase the surface area of the screen where to display contents other than keys, thus improving the visibility. Moreover, it also makes it possible to increase the display area against each key, improving the operability.

FIG. 21 is a drawing showing the structure of the buffer 82 for character conversion. The buffer 82 for character conversion is provided in the work area 27 for internal processing, for example, of the RAM 8 and the data stored in the buffer 82 for character conversion is constructed by including inputted character data A, character string conversion data B and data C indicating the state of conversion. The inputted character data A is stored in the inputted character data storing area 83, the character string conversion data is stored in the character string conversion data storing area 84 and the data C indicating the state of conversion is stored in the conversion state storing area 85.

FIGS. 22A–22D are drawings showing the buffer 82 for character conversion at the time of inputting of characters "shoudan" (商談) (=business talk). In the initial state where there is no input of characters as shown in FIG. 22A, "00H" is inputted in the areas 83–85 as shown in FIG. 22A. When "shoudan" (しょうだん) as indicated in FIG. 22B is inputted, "shoudan 00H" (しょうだん 00H) is inputted in the area 33 as inputted character data A as shown in FIG. 22B. When once conversion to Chinese characters is carried out and display as "shoudan (in Chinese characters)" (しょうだん 00H), "shoudan 00H (Chinese characters)" is inputted as character string conversion data B in the area 84 as shown in FIG. 22C, and "01H" is inputted in the area 85 as data C indicating the state of conversion. When the displayed Chinese characters are adopted and the display board 35 as shown in FIG. 22D is initialized, the buffer 82 for character conversion makes an input of "00H" in the areas 83–85 as shown in FIG. 22A. When conversion to Chinese characters is carried out once again, the next candidate of "shoudan' (Chinese characters) 00H" (章段 00H) will be inputted in the area 84 as character conversion data B, and "02H" will be inputted in the area 85 as data C indicating the state of conversion. The data C is increased by "1" each time when a conversion is made but is decreased by "1" each time when display of the previous candidate is instructed with the preceding candidate key 81.

By the way, it is possible to once store the number of converted characters at the time of the first conversion in an area set separately from the areas 83–85 inside the buffer 82 and display the candidate characters in the following way. For example, the total number of candidate characters is fixed as 10, a total number of candidate characters storing area is set inside the buffer 82 and "0AH" is stored in that area. The data stored in this total number of candidate characters storing area and the data C are compared, and if conversion is instructed when both data are "0AH", the data C is considered as "01H" and the first candidate characters are displayed on. Moreover, if display of the previous characters is instructed when the data C is "01H", the CPU 6 displays the 10th candidate characters with the data C as "0AH".

Although indication is given as "shoudan (hiragana)" (しょうだん), "shoudan (Chinese characters)" (商談), "shoudan' Chinese characters)" (章段) in FIGS. 22A–22D, the character codes corresponding to those characters are inputted as either data A or data B in reality.

Figure 23:
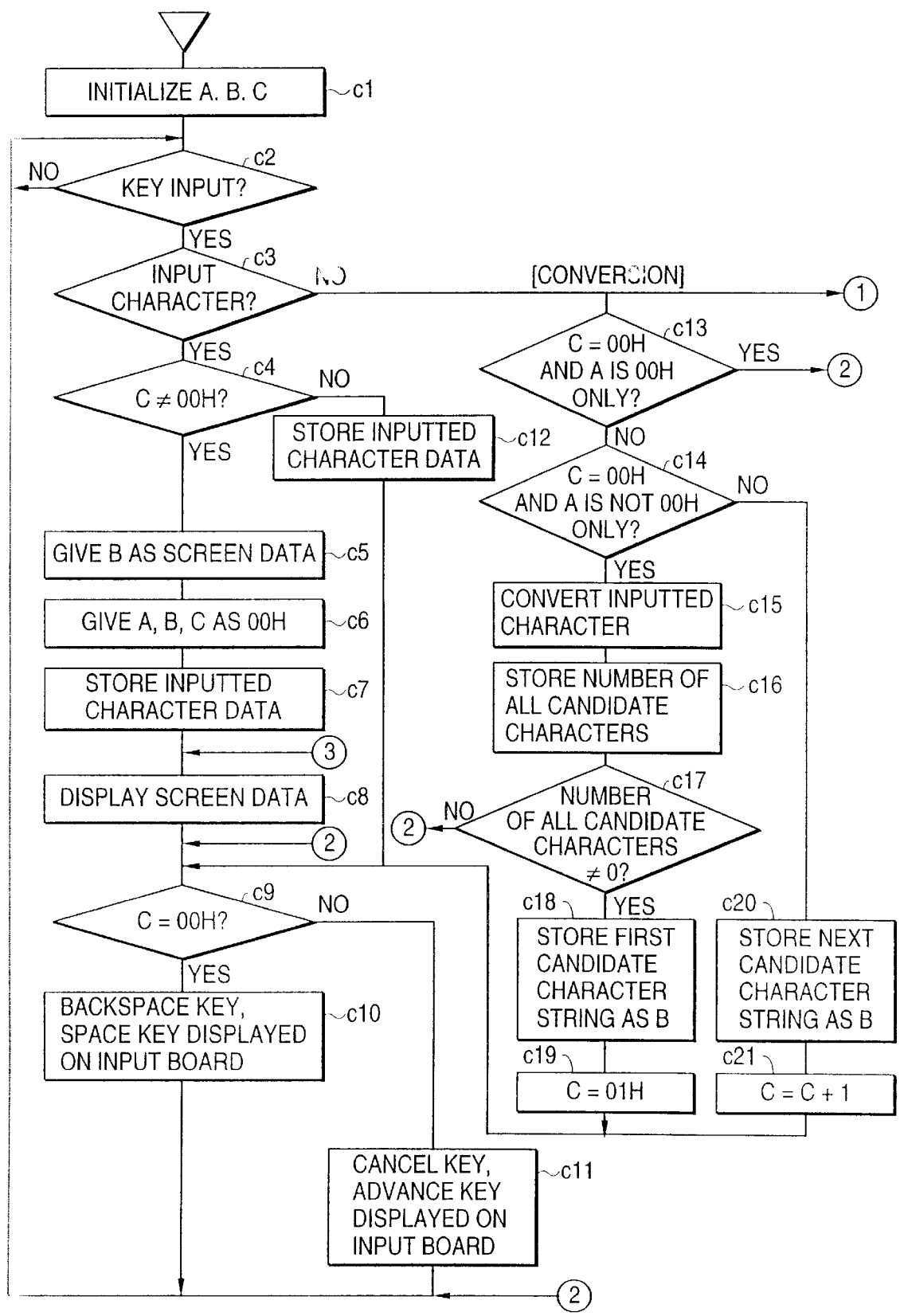
FIG. 23 is a flow chart showing the automatic key switching operation corresponding to the process under execution.

FIG. 23 is a flow chart showing the automatic switching operation of the key corresponding to the process under execution. In step c1, the data A, B, C are initialized and "00H" is inputted in the respective data storing areas 83–85. In step c2, judgment is made whether there was a key inputted or not. The CPU 6 will move to step c3 if it judges that there was a key input but will remain on standby in step c2 if it judges that there was no key input. In step c3, judgment is made whether the key input is an input of characters or not. The CPU 6 will move to step c4 if it judges that the input is an input of characters but performs processes corresponding to the respective keys if it judges that the input is no an input of characters.

In step c4, judgment is made about if the data C is not "00H". The CPU 6 will move to step c5 if it judges that the data C is not "00H" but will move to step c12 if it judges that the data C is "00H". In step c5, the data B will be given as screen data. In step c6, the data A, B, C will be given as "00H". In step c7, the character data A input is stored in the area 83. In step c8, the screen data is displayed.

In step c9, judgment is made about if the data C is "00H". The CPU 6 will move to step c10 if it judges that the data C is "00H" but will move to step c11 if it judges that the data C is not "00H". In step c10, the backspace key 72 and the space key 76 are displayed on the input board 38. In step c11, the cancel key 80 and the preceding candidate key 81 are displayed on the input board 38. The CPU 6 will return to step c2 when the steps c10 and step c11 are over. If the CPU 6 moves to step c12 by judging that the data C is "00H" in step c4, the character data A input will be stored in the area 83. When the operation of step c12 is over, the CPU 6 will move to step c9.

In the case where it is judged that the key input is not an input of characters in step c3, i.e. a case where conversion is instructed from the conversion key, for example, the CPU 6 will move to step c13 and judge if the data C is "00H" and that the data A is "00H" only or not. When it judges that those conditions are satisfied, the CPU 6 will return to step c2. When it judges that those conditions are not satisfied, the CPU 6 will move to step c14. In step c14, judgment is made whether the data C is "00H" and that the data A is not "00H" only. The CPU 6 will move to step c15 when it judges that those conditions are satisfied. When it judges that those conditions are not satisfied, the CPU 6 will move to step c20. In step c15, the inputted characters are converted. In step c16, all candidate characters are stored. In step c17, judgment is made whether all candidate characters are not 0. If it judges that all candidate characters are 0, the CPU 6 will return to step c2. In step c18, the candidate character string in the foremost position is stored in the area 84 as data B. In step c19, the data C is given as "01H". When the operation of step c19 is over, the CPU 6 will move to step c9.

In step c20, the next candidate character string is stored in the area 84 as data B. In step c21, 1 is added to the data C. When the operation of step c21 is over, the CPU 6 will move to step c9.

Figure 24:
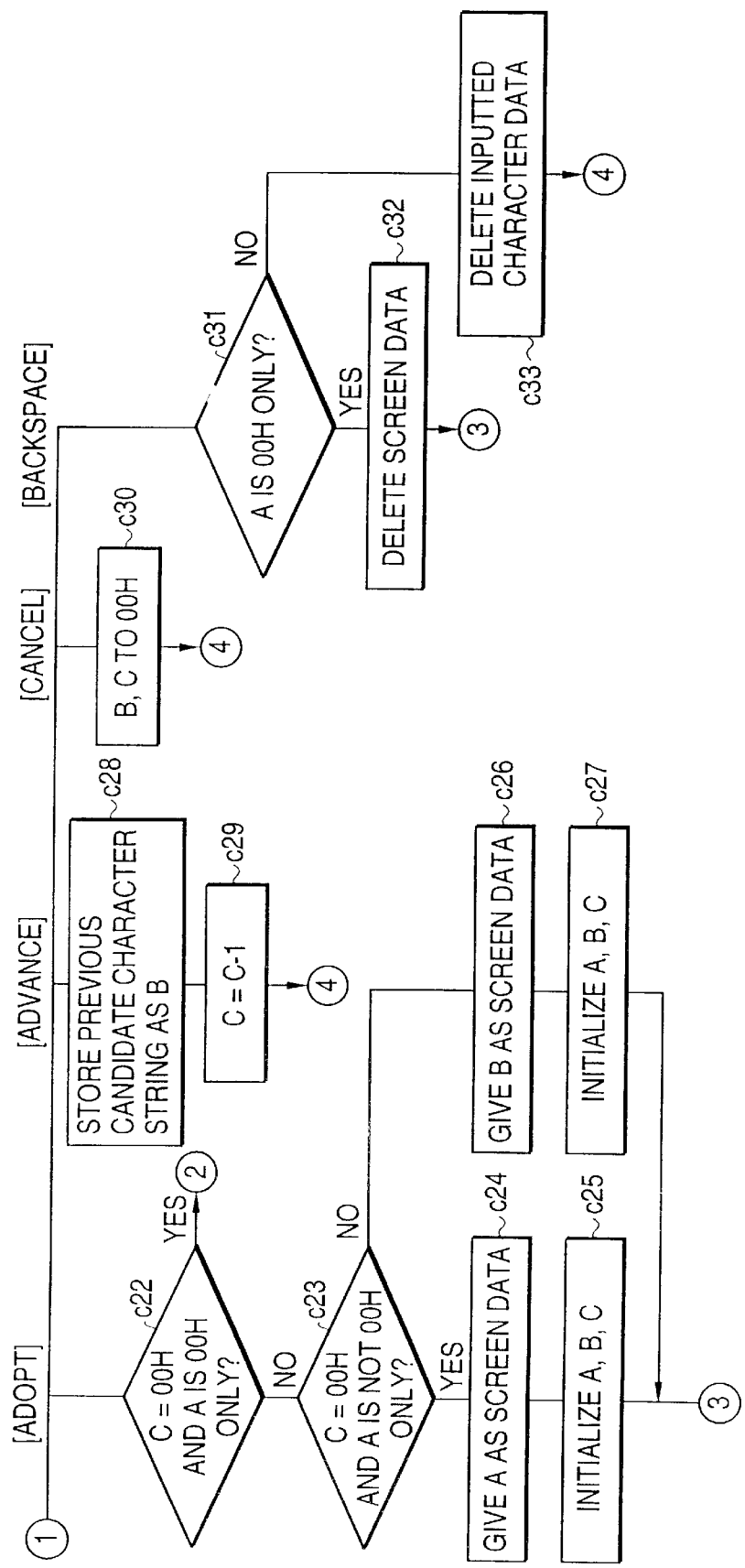
FIG. 24 is a flow chart showing the operation at the time of selection of an adopt key 77, a preceding candidate key 81, a cancel key 80 and a backspace key 72.

FIG. 24 is a flow chart showing the operation at the time of selection of the adopt key 77, preceding candidate key 81, cancel key 80 and backspace key 72. In the case where it is judged that the key input is not an input of characters and adoption is instructed from the adopt key 77 in step c3, the CPU 6 will move to step c22 and makes judgment whether the data C is "00H" and that the data A is "00H" only. When it judges that those conditions are satisfied, the CPU 6 will return to step c2. When it judges that those conditions are not satisfied, the CPU 6 will move to step c23. In step c23, it is judged whether the data C is "00H" and the data A is not only "00H". The CPU 6 will move to step c24 when it judges that those conditions are satisfied. When it judges that those conditions are not satisfied, the CPU 6 will move to step c26. In step c24, the data A will be given as screen data. In step c25, the data A, B, C are initialized. In step c26, the data B is given as screen data. In step c27, the data A, B, C are initialized. When the operation of step c25 and step c27 is over, the CPU 6 will return to step c8.

In the case where instruction is given from the preceding candidate key 81, the CPU 6 will move to step c28 and store the previous candidate character string as data B. In step c29, 1 is deducted from the data C. When the operation of step c29 is over, the CPU 6 will return to step c9.

In the case where instruction is given from the cancel key 80, the CPU 6 will move to step c30 and give the data B, C as "00H". When the operation of step c30 is over, the CPU 6 will return to step c9.

In the case where instruction is given from the backspace key 72, the CPU 6 will move to step c31 and judge whether the data A is "00H" only. The CPU 6 will move to step c33 when it judges that the data A is "00H" only but will move to step c33 when it judges that the data A is not "00H" only. In step c32, the screen data is deleted. In step c33, the character data input is deleted. When the operation of step c32 is over, the CPU 6 will return to step c8. When the operation of step c33 is over, the CPU 6 will return to step c9.

The automatic key switching operation of this embodiment can be performed based on the operator's instruction by providing key for utilizing automatic switching and key for prohibiting automatic switching. For example, set a work area of 1 byte in the buffer 82 for character conversion and, when execution of the switching function is instructed from the automatic switching utilizing key, input "01H" in the work area. Moreover, when prohibition of switching function is instructed from the automatic switching prohibiting key, input "01H" in the work area. The CPU 6 will judge whether or not the automatic key switching operation should be executed according to the data in the work area. When the automatic key switching operation is not executed, the keys are always fixed and, for example, the backspace key 72 and the space key 76 are not displayed but the cancel key 80 and the preceding candidate key 81 will be displayed in place of the backspace key 72 and the space key 76.

Next, the third function of the present invention will be described. The third function is a function of automatically recognizing characters input in handwriting as characters so as to improve the character recognition ratio. In this embodiment, input of characters in handwriting is made by using the handwritten memo function. And the recognition of characters is made by the known method. In this embodiment, however, explanation will be given on an example of character recognition made by stroke information to be described below. In the ROM 7, a program is stored for controlling such operations as handwritten input, display, character recognition, storing/display of inputted data, etc. in this function. Moreover, data of the fonts and patterns of character recognition, etc. of the characters to be displayed is also stored.

Figure 25A:
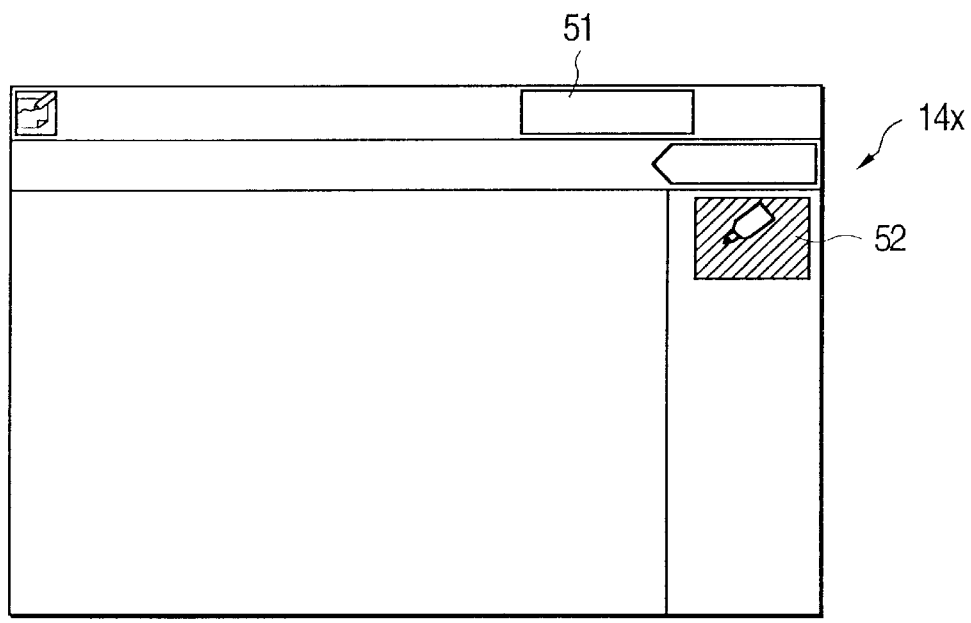
FIGS. 25A, 25B are plan views showing in progressive steps the display image displayed at the time of inputting in handwriting.
Figure 25B:
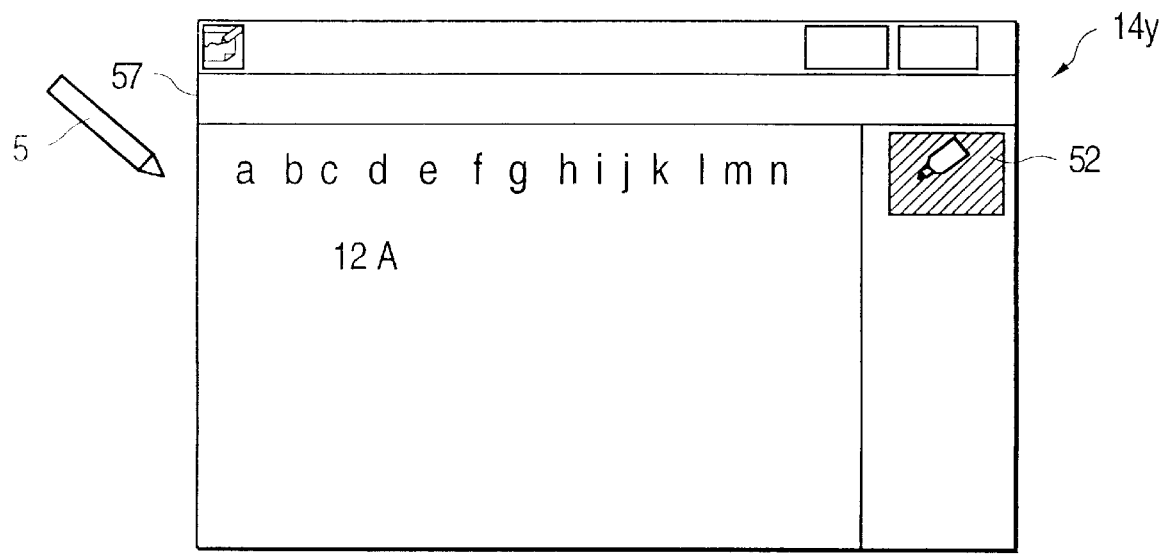

FIGS. 25A, B are plan views showing in progressive steps the display image displayed at the time of inputting by handwriting. The handwritten memo key 3c in the function selecting key unit 3 is selected and the display image 14x as shown in FIG. 25A is displayed. When the new input button 51 is indicated with the input pen 5, the newly input picture is obtained and the operator inputs characters in this picture in handwriting. For example, we will explain character recognition of a case in which alphabet, numerals, etc. are input as shown in FIG. 25B. The characters are input about horizontally from left to right on the screen.

The coordinate point of the characters inputted in handwriting is detected at predetermined times and stored in the RAM 8. And the contents input in handwriting are displayed on the screen. The coordinate point can be obtained by determining the relative distance from the origin which is taken at the left top edge of the tablet 13 for example. This coordinate point is converted by the A/D converter 12 and stored. The display of the contents input in handwriting is given in the position of the display panel 2 corresponding to the coordinate point converted by the A/D converter 12.

Furthermore, in addition to the coordinate point, PENUP information and PENDOWN information are detected. PENUP information means information indicating separation of the input pen 5 from the input surface of the tablet 13, while PENDOWN information refers to information indicating that the input pen 5 touched the input surface of the tablet 13. Stroke information is constructed by including PENUP information, PENDOWN information and the coordinate point and a plurality of such stroke information is obtained in correspondence to the characters input in handwriting. In this embodiment, recognition of characters is made with stroke information. In the case where the detected coordinate point is the same as the previously detected one, this new data is not stored and this enables compression of the data.

FIGS. 26A–26D are plan views showing in progressive steps the display image displayed at the time of recognition of characters input in handwriting. After the input in handwriting, the character recognition selecting picture 91 as shown in FIG. 26A is displayed with selection of the menu key 4 and becomes display image 14aa. The characters recognized as handwritten ones are displayed in black during a display in white, for example. On the character recognition selecting picture 91, line unit recognition button 92 and selecting unit recognition button 93, etc. are displayed. The operator specifies the line for making character recognition after selecting the button 92. The selecting unit recognition button 93 is for performing character recognition by specifying an area. The operator specifies the area for making character recognition after selecting the button 93.

For example, when the line unit recognition button 92 is selected and a line 101 is specified, image data D is prepared based on the coordinate point of the characters input in line 101 and that data D is stored. The image data D is a set of coordinate points based on the output of the tablet 13. The image data D is divided into image data D in single-character units according to the preset procedure to turn into the display image 14ab in which the characters in the line 101 are displayed by reversing black and white. This specific area is the area of the divided image data D in single-character units. The shaded area in FIGS. 26A–26D and FIGS. 29, 30, 31, 32A, 32B to be described below indicates that the display is given by reversing black and white in that area. Q101 After that, recognition of characters is made according to the preset procedure by using the divided image data D. From among the group of candidate character data, the first candidate characters are displayed in the first candidate character display area 102 as shown in FIG. 26C and the reversed display of the recognized characters returns to normal to provide the display image 14ac. In the case where no candidate characters exist, the display of the area corresponding to the first candidate character display area 102 turns into a character 118, "◆" for example, indicating the absence of candidate character and the characters input by handwriting are displayed in the reversed state. The illustrated display indicates that the character input in handwriting as "g" could not be recognized. Moreover, the cursor 103 is displayed in the first candidate character display area 102.

Characters which could not be recognized are recognized again by the procedure to be described below and erroneously recognized characters are also corrected by the procedure to be described below. At that time, correction is instructed with the correction button 94. When correct results of character recognition are obtained, registration is instructed from the registration key 58 after inputting of "note" in the title column 57. If registration is instructed, the character cord indicting the recognized character is stored and the character expressed with the character code is displayed instead of the character input in handwriting to provide the display image 14ad as shown in FIG. 26D.

FIG. 27 is a drawing showing the structure of the buffer 95 for recognition of characters. The buffer 95 for recognition of characters is provided in the work area 27 for internal processing, for example, of the RAM 8 and the data stored in the buffer 95 for recognition of characters is constructed by including image data D of characters input in handwriting, first candidate character string data E after recognition and candidate character string data group F after recognition. The image data D is stored in the image data storing area 96, the first candidate character string data E is stored in the first candidate character string data storing area 97, and the candidate character string data F is stored in the candidate character string data group storing area 98.

FIGS. 28A, 28B are drawings showing the buffer 95 for recognition of characters at the time of recognition of characters. By the time when recognition of characters is instructed from the character recognition selecting picture 91, nothing is stored in the area 96 as shown in FIG. 28A, and "00H" is inputted in the areas 97, 98. When line unit recognition as mentioned above is selected, the characters in the indicated line 101 is stored in the area 96 as image data D. After that, recognition of characters is made by the preset procedure by using the stored image data D, and the first candidate character string data E is stored in the area 97 and the candidate character string data F is stored in the area 98. Namely, as shown in FIG. 28B, input is made as "a, b, c, d, e, f, ♦, h, i, j, k, l, m, n, 00H" in the area 97 while small "a" in full width, small "a" in half width, "hi" ( ひ ) in full-width hiragana, small "c" in full width and small "c" in half width are inputted in this order in the area 98, followed by an input of "03H" with repeated input of "b", "c" input in handwriting, candidate characters— and "03H" and lastly "00H". As candidate characters, characters of similar forms are selected for example.

Recognition of characters is made by dividing the image data D into image data D in single-character units according to the preset procedure and selecting candidate character string data similar to the divided image data D in single-character units from among the prestored candidate character string data group. At that time, the stroke information is utilized.

FIG. 29 is a drawing for explaining the procedure of splitting the image data D into image data D in single-character units. After selecting either the line unit recognition button 92 or the selecting unit recognition button 93 of the character recognition selecting picture 91, specify the line or area for performing recognition of characters as mentioned above. We will explain for example a case where the illustrated indicating position 106 is instructed when specifying line. First, the coordinate point of the indicating position 106 is detected and the coordinate position of the characters input in handwriting closest to the detected coordinate point is detected. In FIG. 29, the coordinate position of the character "b" input in handwriting is detected. Next, with reference to the coordinate position of the character "b" detected, the image data D is traced up by single- character unit with the PENUP information and the PENDOWN information to detect the coordinate position of the character in the forefront position i.e. the character "a" input in handwriting. Moreover, the image data D is divided into image data D in single-character units. The illustrated single-character areas 107–109 represent the areas of the divided image data D and the display of the areas 107–109 is reversed in black and white. Namely, the characters "a", "b", "c" input in handwriting on the black ground are displayed in white color.

Recognition of characters is made by the order of strokes in writing obtained from the stroke information for example.

Namely, the divided image data D in single-character units is cut out, and the order of strokes in writing obtained from the stroke information corresponding to the cut out image data D is compared with the order of strokes in writing stored in advance in the ROM 7 and the candidate characters with an order of strokes in writing close to the order of strokes in writing of the cut out image data D are selected in the number of 10 for example. Moreover, the character whose order of strokes in writing is closest to that of the reference is designated as first candidate character.

In the ROM 7, a plurality of order of strokes in writing are stored for a single character and recognition of characters can be made also for characters inputted with wrong order of strokes in writing, abbreviated characters or deformed characters, etc. for example.

Figure 30:
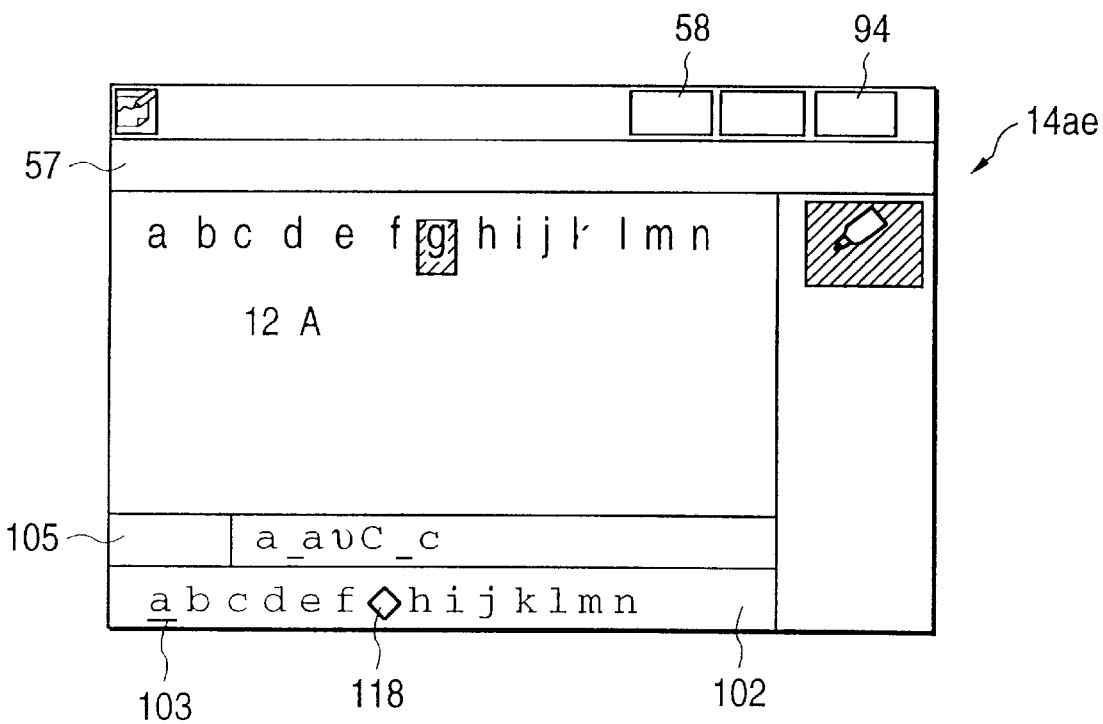
FIG. 30 is a plan view showing a display image 14ae at the time of correction of the characters which were wrongly recognized before.

FIG. 30 is a plan view showing the display image 14ae at the time of correction of the characters which were recognized in a wrong way before. When the cursor 103 displayed in the first candidate character display area 102 is moved, the candidate character for the character of the moved position is displayed. For example, when the cursor is moved to under "a", the candidate character for "a" is displayed in the candidate character display area 105. As the operator selects the desired character from among the displayed candidate characters and indicate it with the input pen 5, the selected character will be newly displayed in place of the character displayed in the area 102.

Figure 31:
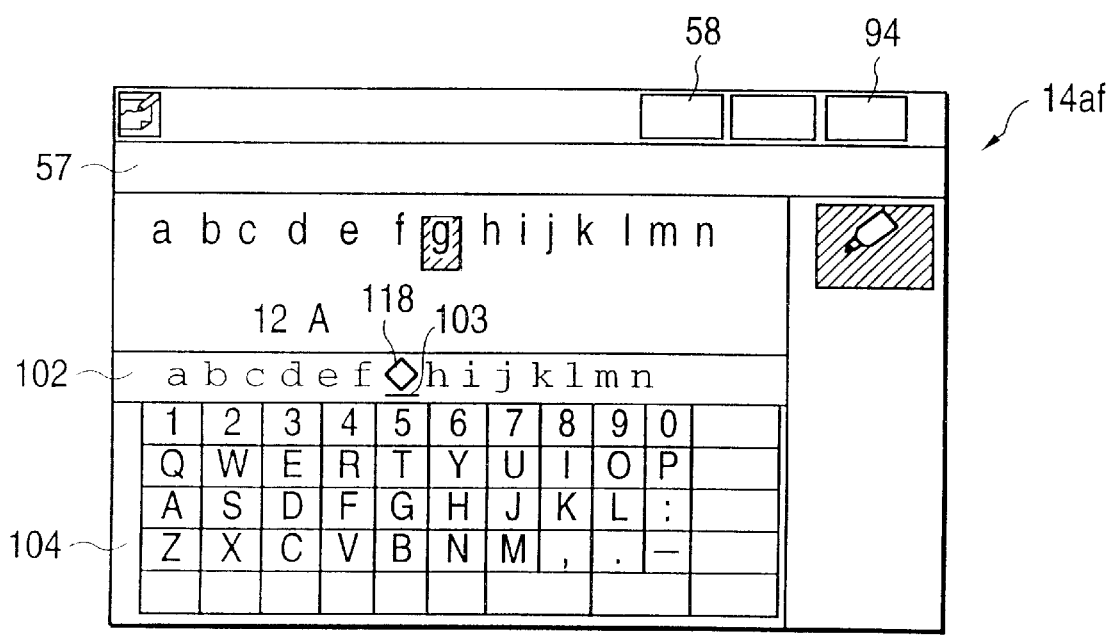
FIG. 31 is a plan view showing a display image 14af at the time of anew recognizing the characters which could not be recognized before.

FIG. 31 is a plan view showing the display image 14af at the time of anew recognizing of the characters which could not be recognized before. When the cursor 103 displayed in the first candidate character display area 102 is moved to under the character 118 "♦" which indicates absence of candidate character data, the character input board 104 is displayed. The character input board 104 is provided with keys similar to those of the typewriter input board 38 for example and, when a desired character is instructed, that character is displayed in place of the character 118 "♦".

Figure 32A:
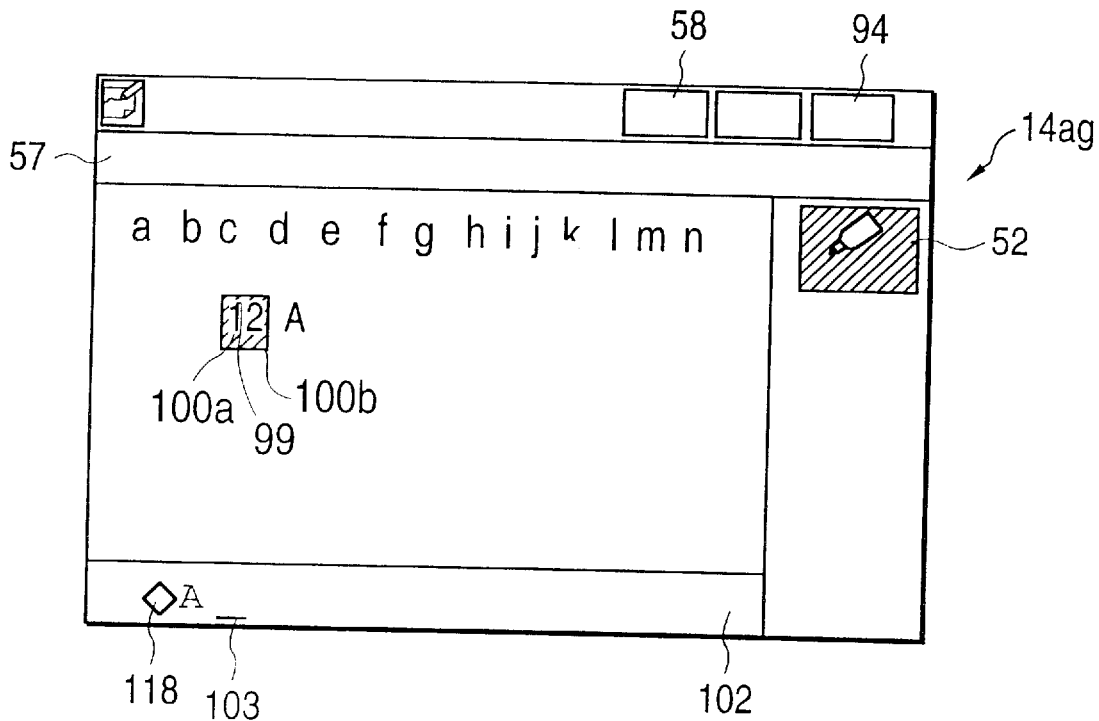
FIGS. 32A, 32B are plan views showing other display images at the time of anew recognizing.
Figure 32B:
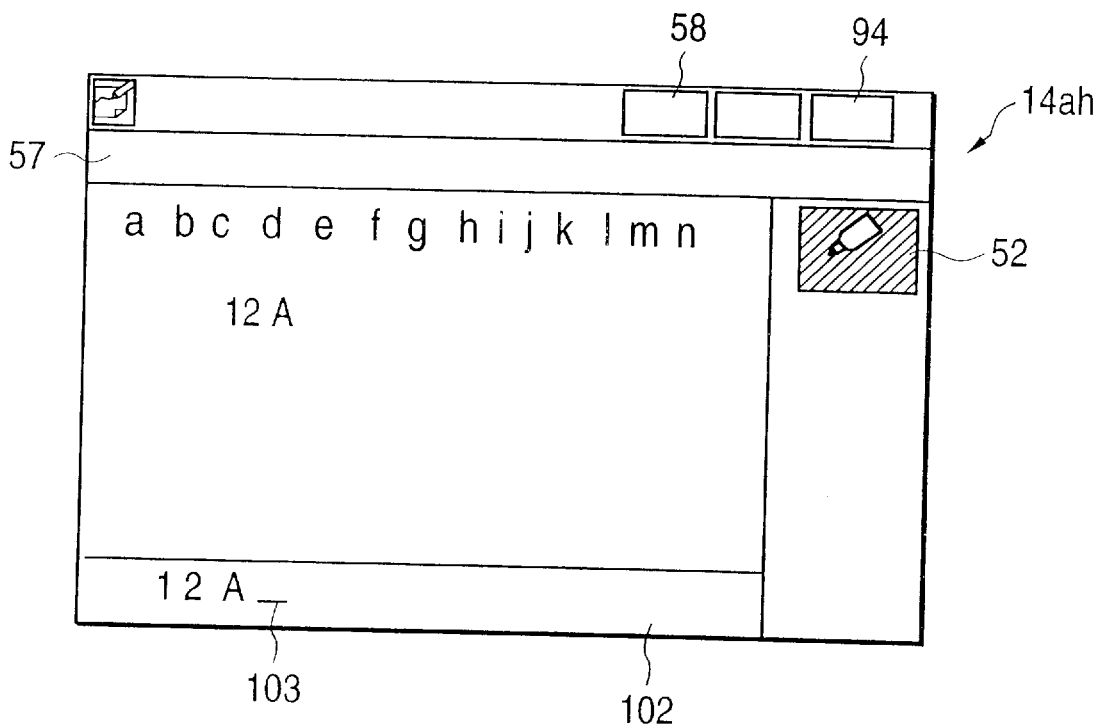

FIGS. 32A, 32B are plan views showing other display images at the time of a new recognizing. The display image 14ag indicated in FIG. 32A indicates that "12" of the characters input as "FIG. 12A" could not be recognized and character 118 indicating absence of candidate character data corresponding to "12" i.e. "♦" is displayed in the character displayed in the area 102. At the time of a new recognizing, the operator indicates about the center point 99 between "1" and "2" of "12" with the input pen 5. The CPU 6 newly divide the image data D into single-characater units and performs recognition of characters of divided single character areas 100a, 100b based on the coordinate point of the instructed point 99. Namely, the input "12" input in handwriting is divided into "1" and "2" so that the recognition of characters is carried out. The characters in the single character areas 100a, 100b correspond to the areas displayed in reversed black and white. When the input "12" is divided into single-characater units and recognition of characters is made, the display image 14ah as shown in FIG. 32B is obtained. Namely, "12" is displayed in place of the character 118 "♦" and the characters which were displayed in reversed black and white with handwritten input return to normal and are displayed in black on white ground. Q112 As explained above, since the image data D input in handwriting is automatically recognized in single-characater units for recognition of characters in this embodiment, the complicated operations of the operator are reduced. Moreover, because the recognized characters are stored as character codes, characters input in handwriting can be utilized easily in other functions. Furthermore, the situation of recognition of characters is displayed on the screen and it is also possible to easily perform correction of erroneously recognized characters and anew recognizing of characters which could not be recognized before, thus improving the operability of the electronic apparatus 1.

FIG. 33 is a flow chart showing the operation at the time of splitting of the image data D. In step d1, the coordinate point indicated with the input pen 5 is detected. In step d2, the coordinate point of the character closest to the coordinate point indicated with the input pen 5 is detected. Moreover, the order of the character in the characters input in handwriting is judged. Namely, the image data D of the characters inputted from the detected coordinate point is traced up in search for PENUP information and PENDOWN information. This makes it possible to determine the position of the character in the image data.

In step d3, the coordinate position of the character just before the character is detected. In step d4, judgment is made whether the character is the character in forefront position or not. The CPU 6 will move to step d5 if it judges that the character is the character in forefront position, but return to step d3 if it judges that the character is not the character in forefront position. In step d5, judgment is made whether the division is finished or not in all characters input. The CPU 6 will perform the next operation if it judges that all characters have been divided. The CPU 6 will return to step d5 if it judges that no division of all characters has been made.

Figure 34:
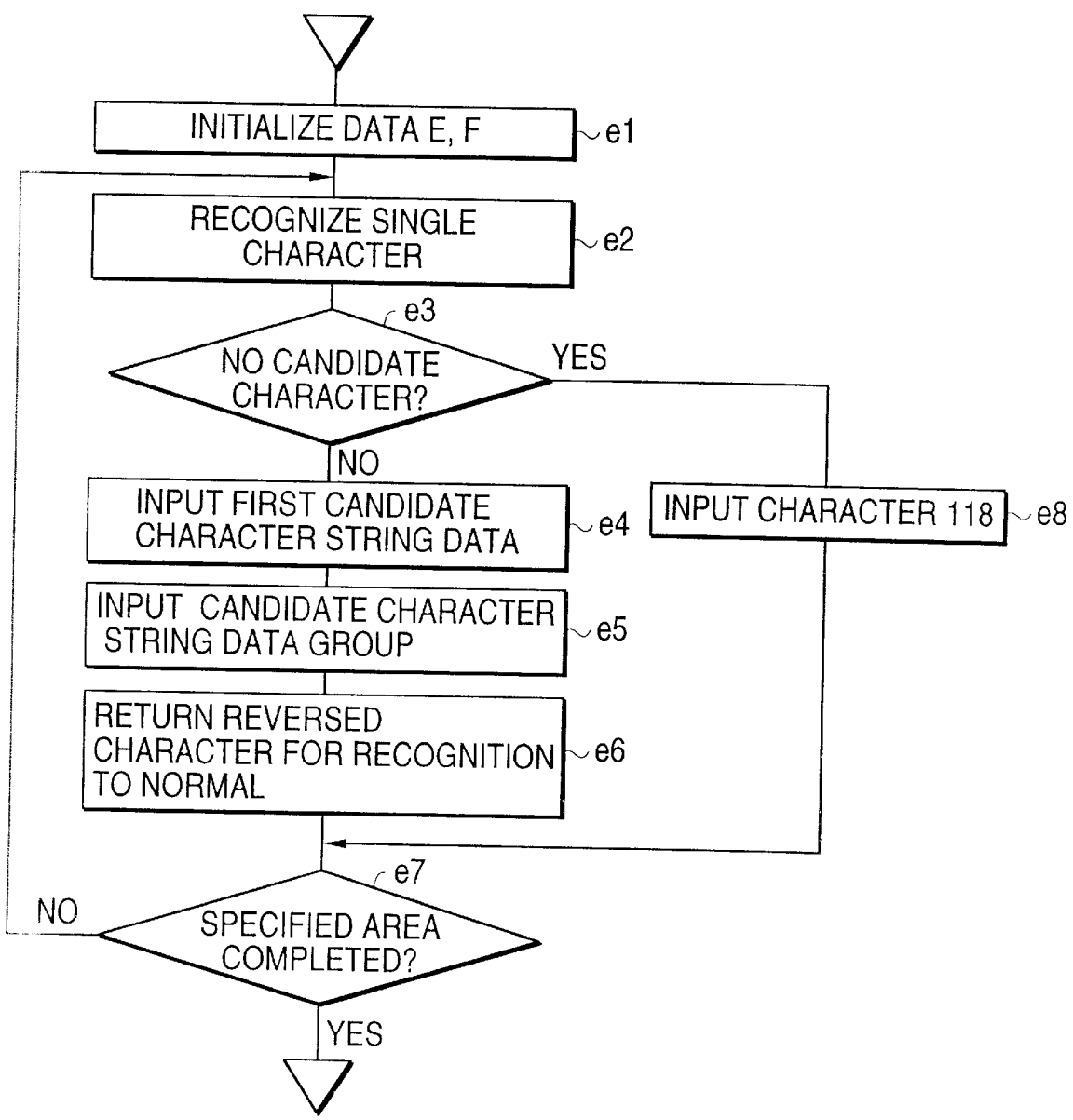
FIG. 34 is a flow chart showing the operation at the time of recognition of characters.
Figure 35:
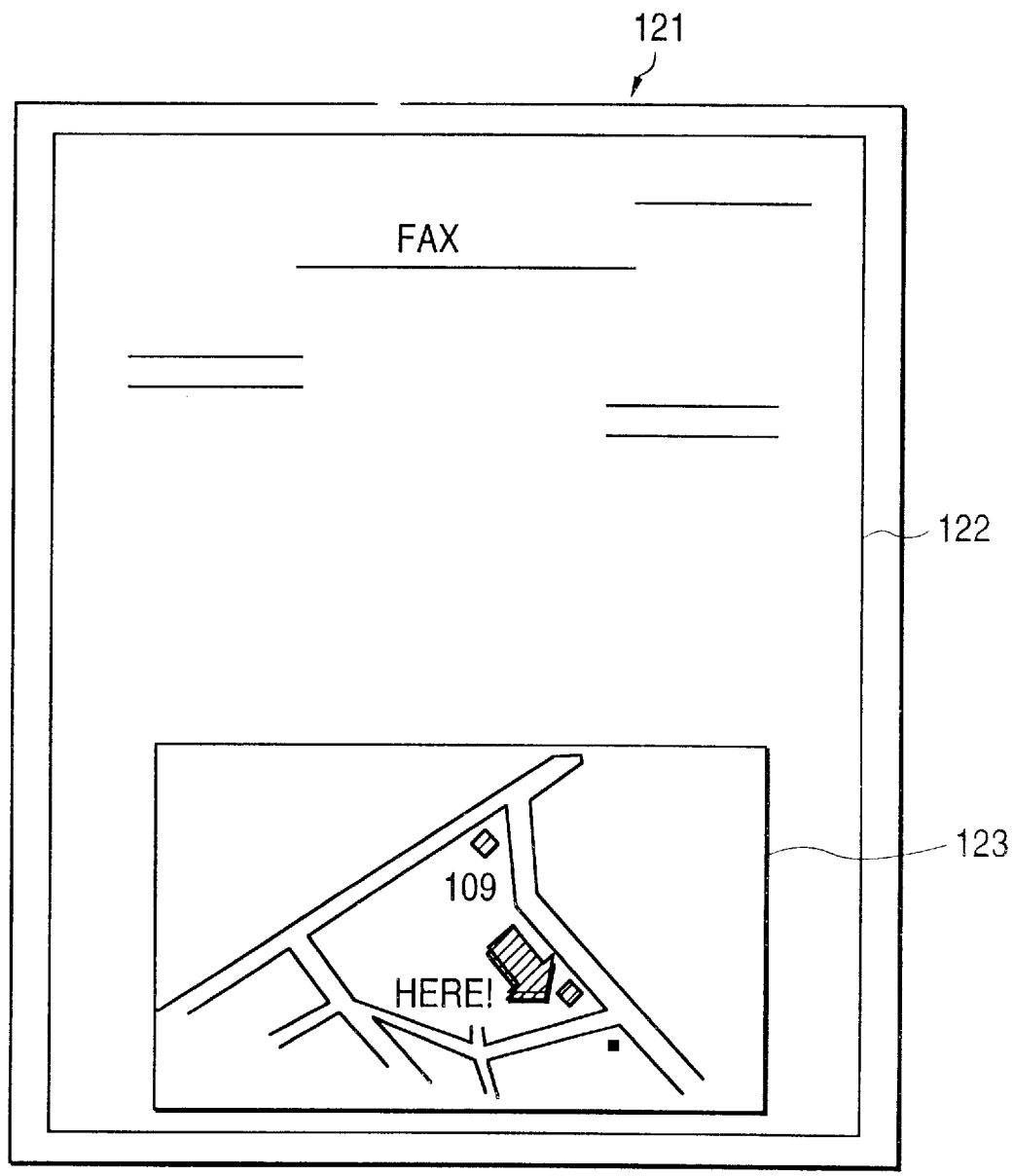
FIG. 35 is a plan view showing an example of the display image 121 at the time of displaying of the data file submitted to pasting on a conventional electronic apparatus.

FIG. 34 is a flow chart showing the operation at the time of recognition of characters. In step e1, the data E and the data F are initialized and "00H" is input in the areas 97, 98. In step e2, the image data for one character is divided and cut out for recognition of characters from the image data D stored in the area 96. In step e3, judgment is made whether there is no candidate character as a result of the recognition of characters. The CPU 6 will move to step e8 if it judges that there is no candidate character but moves to step e4 if it judges that there is some candidate character. In step e4, the first character string data is input in the area 97 as data E. In step e5, the character string data group is input in the area 98 as data F and "03" is also input after the character string data group in the area 98. In step e6, the character displayed in reversed black and white is returned to normal.

In step e7, judgment is made whether the recognition of characters of the specified area has been completed or not. The CPU 6 will perform the next operation if it judges that the recognition of characters of the specified area has been completed but return to step e2 if it judges that the specified area has not yet been completed.

In step e8, the data representing the character 118 is input as data E in the area 97 and "03H" is inputted in the area 98. The CPU 6 will move to step e7 when the operation of step e8 is over.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic apparatus comprising:
    inputting means provided with an input surface in which orthogonal coordinates are set in advance, outputting a signal which indicates a coordinate point instructed by predetermined instructing means, and having the property of transmitting light;
    display means having a display surface;
    a plurality of data file preparing means for preparing data files of prescribed forms based on the output of the inputting means;
    data file storing means for storing the data files; and
    data file reading means for reading the data files stored in the data file storing means and forwarding the read data files for display on the display means,
    the inputting means being disposed on the display surface of the display means,
    the data file preparing means displaying a plurality of keys indicating the kinds of processes to be executed on the display means and recognizing the kind of key displayed in the point instructed by the inputting means to perform the process corresponding to the key,
    wherein the data file preparing means writes pasting instructing data indicating pasting of a data file prepared by other data file preparing means in the data file; and
    the data file reading means reads out the data file specified by the pasting instructing data from the data file storing means and displays the data file read out on the display means when the display position of the pasting instructing data is instructed by the inputting means while any data file including the pasting instructing data is displayed on the display means.

2. The electronic apparatus of claim 1, further comprising updating means for storing the pasting instruction data in the any data file.

3. The electronic apparatus of claim 1, wherein the data file preparing means displays a plurality of keys indicating the kinds of processes to be executed.

4. The electronic apparatus of claim 3, wherein the data file preparing means identifies the kind of key displayed in the position instructed by the inputting means to perform the function corresponding to the key and changes to another kind of key in accordance with the function.

5. The electronic apparatus of claim 1, wherein the image data preparing means prepares image data as a group of coordinate points set on the input surface based on the signal's output by the inputting means.

6. The electronic apparatus of claim 5, wherein the image data preparing means further includes dividing means for splitting the image data into image data in single-character units in accordance with the coordinate points of the characters and a reference coordinate point, and character recognizing means for recognizing character by selecting candidate character data similar to the dividing image data in single-character units from among a prestored group of candidate character data.

7. The electronic apparatus of claim 6, wherein, when a first process to be executed is selected, the data file preparing means changes the keys being displayed in correspondence to second processes to be used with the first process.

8. The electronic apparatus of claim 6, wherein the dividing means further splits the image data previously split into single-character units but which could not be recognized as characters, into at least two new image data in single-character units according to another reference coordinate point.

9. The electronic apparatus of claim 6, wherein the image data preparing means includes altering means for changing the character candidate data to be specified from among the prestored group of character candidate data when any change of recognized character is instructed.

10. The electronic apparatus of claim 6, wherein the character recognizing means includes means for comparing an order of strokes of the image data with an order of strokes of a candidate character.

11. The electronic apparatus of claim 10, wherein the character recognizing means further includes means for designating a candidate character having an order of strokes closest to the order of strokes of the image data as a first candidate character and means for replacing the first candidate character with another selected character.

12. The electronic apparatus of claim 6, wherein the dividing means includes splitting the image further in accordance with contact of the predetermined instruction means on the input surface.

13. The electronic apparatus of claim 6, wherein the dividing means includes means for beginning the splitting at a character at a front end of the image data to be recognized.

14. The electronic apparatus of claim 6, wherein the display reverses a background and image data when the image data has been split, and returns the background and image data to its original appearance when the character represented by the image data has been recognized.

15. The electronic apparatus of claim 1, wherein the pasting instruction data includes information indicative of pasting, information indicative of an application file name and information indicative of a data file name.

16. The electronic apparatus of claim 1, wherein the pasting instruction data is displayed in a predetermined box.

17. The electronic apparatus of claim 1, wherein the pasting instruction data is automatically prepared and displayed.

18. The electronic apparatus of claim 1, wherein the data file specified by the pasting instructing data is displayed on the display means while overlaying the any data file including the pasting instructing data.

19. A method for pasting data comprising the steps of:

setting orthogonal coordinates of a transparent input surface in advance;

outputting a signal which indicates a coordinate point input by a user on the input surface;

preparing data files of prescribed forms based on the signal from the outputting;

storing the data files;

reading the stored data files;

forwarding the read data files for display;

displaying a plurality of keys indicating the kinds of processes to be executed at a display area;

recognizing the kind of key displayed at the instructed coordinate point to perform a process corresponding to the key;

writing pasting instruction data indicating pasting of a data file prepared by another preparing step into the data file;

reading the data file specified by the pasting instruction data; and displaying the data file at the display area when the display position of the pasting instruction data is instructed while any data file including the pasting instruction data is also displayed at the display area.

20. The method of claim 19, further comprising storing the pasting instruction data in the any data file.

21. The method of claim 19, further comprising displaying a plurality of keys indicating the kinds of processes to be executed.

22. The method of claim 21, further comprising identifying the kind of key displayed in the position instructed to perform the function corresponding to the key and changing to another kind of key in accordance with the function.

23. The method of claim 19, further comprising preparing image data as a group of coordinate points set on the input surface based on the signals from the outputting.

24. The method of claim 23, further comprising splitting the image data into image data in single-character units in accordance with the coordinate points of the characters and a reference coordinate point, and recognizing a character by selecting character candidate data similar to the split image data in single-character units from among a prestored group of character candidate data.

* * * * *